(12) United States Patent
Oh et al.

(10) Patent No.: US 12,722,979 B2
(45) Date of Patent: Sep. 1, 2026

(54) AEROGEL BLANKET

(71) Applicant: LG CHEM, LTD., Seoul (KR)

(72) Inventors: Myung Eun Oh, Daejeon (KR); Kyoung Shil Oh, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 513 days.

(21) Appl. No.: 17/418,383

(22) PCT Filed: Sep. 1, 2020

(86) PCT No.: PCT/KR2020/011710
§ 371 (c)(1),
(2) Date: Jun. 25, 2021

(87) PCT Pub. No.: WO2021/045484
PCT Pub. Date: Mar. 11, 2021

(65) Prior Publication Data

US 2022/0064010 A1 Mar. 3, 2022

(30) Foreign Application Priority Data

Sep. 3, 2019 (KR) ........................ 10-2019-0109158
Sep. 30, 2019 (KR) ........................ 10-2019-0121123
(Continued)

(51) Int. Cl.
*C01B 33/158* (2006.01)
*C01B 33/154* (2006.01)
(Continued)

(52) U.S. Cl.
CPC ...... *C01B 33/1585* (2013.01); *C01B 33/1546* (2013.01); *C01B 33/159* (2013.01); *D06M 11/79* (2013.01); *C01P 2006/32* (2013.01)

(58) Field of Classification Search
CPC ............ C01B 33/1585; C01B 33/1546; C01B 33/159; C01B 33/158; C01B 33/145;
(Continued)

(56) References Cited

U.S. PATENT DOCUMENTS 1,131,270 A 3/1915 Quick
5,789,075 A 8/1998 Frank et al.
(Continued)

FOREIGN PATENT DOCUMENTS

CN 101137587 A 3/2008
CN 101698583 A 4/2010
(Continued)

OTHER PUBLICATIONS

Yokogawa et al(Hydrophobic silica aerogels, Non-Crystalline Solids, 1995) (Year: 1995).*
(Continued)

*Primary Examiner* — Anthony J Zimmer
*Assistant Examiner* — Logan Laclair
(74) *Attorney, Agent, or Firm* — Morgan, Lewis & Bockius LLP

(57) ABSTRACT

The present invention relates to an aerogel blanket having a moisture impregnation rate of 28 days (MIR-28D) of 100 wt % or less, which is calculated by Equation 1 below:

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100. [Equation 1]

18 Claims, 1 Drawing Sheet

(30) Foreign Application Priority Data

Sep. 30, 2019 (KR) ........................ 10-2019-0121147
Jul. 9, 2020 (KR) ........................ 10-2020-0084763

(51) Int. Cl.
*C01B 33/159* (2006.01)
*D06M 11/79* (2006.01)

(58) Field of Classification Search
CPC .. C01B 33/155; D06M 11/79; C01P 2006/32; C01P 2006/90; B01J 13/0091; C04B 30/02; C04B 2111/27
See application file for complete search history.

(56) References Cited

U.S. PATENT DOCUMENTS

| | | | |
|---|---|---|---|
| 5,830,387 | A | 11/1998 | Yokogawa et al. |
| 6,068,882 | A | 5/2000 | Ryu |
| 6,364,953 | B1 | 4/2002 | Kawakami et al. |
| 6,799,442 | B1 | 10/2004 | Costa et al. |
| 2001/0034375 | A1 | 10/2001 | Schwertfeger et al. |
| 2005/0046086 | A1 | 3/2005 | Lee et al. |
| 2005/0167891 | A1 | 8/2005 | Lee et al. |
| 2008/0093016 | A1 | 4/2008 | Lee et al. |
| 2009/0123358 | A1 | 5/2009 | Costa et al. |
| 2012/0025127 | A1 | 2/2012 | Yeo et al. |
| 2016/0096949 | A1 | 4/2016 | Evans et al. |
| 2018/0009969 | A1 | 1/2018 | Kim et al. |
| 2018/0029892 | A1 | 2/2018 | Yu et al. |
| 2018/0072578 | A1 | 3/2018 | Kim et al. |
| 2018/0094114 | A1 | 4/2018 | Evans et al. |
| 2018/0112057 | A1 | 4/2018 | Evans et al. |
| 2018/0112058 | A1 | 4/2018 | Evans et al. |
| 2018/0134867 | A1 | 5/2018 | Evans et al. |
| 2018/0147811 | A1 | 5/2018 | Oh et al. |
| 2018/0148888 | A1 | 5/2018 | Kim et al. |
| 2018/0179073 | A1 | 6/2018 | Oh et al. |
| 2018/0179074 | A1 | 6/2018 | Kim et al. |
| 2018/0179075 | A1 | 6/2018 | Kim et al. |
| 2018/0244029 | A1 | 8/2018 | Kim et al. |
| 2018/0264793 | A1 | 9/2018 | Kim et al. |
| 2018/0326700 | A1 | 11/2018 | Kim |
| 2018/0354805 | A1 | 12/2018 | Kim et al. |
| 2019/0002356 | A1 | 1/2019 | Jebalkar |
| 2019/0062167 | A1 | 2/2019 | Kim et al. |
| 2019/0119494 | A1 | 4/2019 | Makino et al. |
| 2019/0203014 | A1 | 7/2019 | Evans et al. |
| 2019/0276322 | A1 | 9/2019 | Kim et al. |
| 2020/0025324 | A1 | 1/2020 | Izumi et al. |
| 2020/0048100 | A1 | 2/2020 | Yu et al. |
| 2020/0215791 | A1 | 7/2020 | Oh et al. |
| 2020/0216322 | A1 | 7/2020 | Min et al. |
| 2020/0224005 | A1 | 7/2020 | Kim et al. |
| 2020/0255295 | A1 | 8/2020 | Kim et al. |
| 2020/0308011 | A1 | 10/2020 | Kim et al. |
| 2021/0114887 | A1 | 4/2021 | Oh et al. |
| 2021/0155486 | A1 | 5/2021 | Kang et al. |
| 2021/0198112 | A1 | 7/2021 | Oh et al. |
| 2022/0048778 | A1 | 2/2022 | Kim et al. |

FOREIGN PATENT DOCUMENTS

| | | | |
|---|---|---|---|
| CN | 103910516 | A | 7/2014 |
| CN | 104164758 | A | 11/2014 |
| CN | 105597635 | A | 5/2016 |
| CN | 105664809 | A | 6/2016 |
| CN | 106630930 | A | 5/2017 |
| CN | 106794996 | A | 5/2017 |
| CN | 107034678 | A | 8/2017 |
| CN | 107129262 | A | 9/2017 |
| CN | 107406327 | A | 11/2017 |
| CN | 107523275 | A | 12/2017 |
| CN | 107531495 | A | 1/2018 |
| CN | 107709013 | A | 2/2018 |
| CN | 107735362 | A | 2/2018 |
| CN | 107735385 | A | 2/2018 |
| CN | 107848815 | A | 3/2018 |
| CN | 207310663 | U | 5/2018 |
| CN | 108136749 | A | 6/2018 |
| CN | 108383129 | A | 8/2018 |
| CN | 108585762 | A | 9/2018 |
| CN | 108658572 | A | 10/2018 |
| CN | 108689678 | A | 10/2018 |
| CN | 108821741 | A | 11/2018 |
| CN | 109415214 | A | 3/2019 |
| CN | 109437832 | A | 3/2019 |
| CN | 109868598 | A | 6/2019 |
| CN | 110615663 | A | 12/2019 |
| CN | 111925186 | A | 11/2020 |
| EP | 3 284 720 | A1 | 2/2018 |
| EP | 3 375 757 | A1 | 9/2018 |
| EP | 3453676 | A1 | 3/2019 |
| EP | 3569304 | A1 | 11/2019 |
| EP | 3 778 483 | A1 | 2/2021 |
| EP | 3 878 812 | A1 | 9/2021 |
| EP | 3 901 094 | A1 | 10/2021 |
| JP | 2001-007100 | A | 1/2001 |
| JP | 2001-072408 | A | 3/2001 |
| JP | 2003-513873 | A | 4/2003 |
| JP | 4115088 | B2 | 7/2008 |
| JP | 2008-532898 | A | 8/2008 |
| JP | 2011-190136 | A | 9/2011 |
| JP | 2012-144428 | A | 8/2012 |
| JP | 2014-173222 | A | 9/2014 |
| JP | WO2017/010551 | A1 | 1/2017 |
| JP | 2017-533163 | A | 11/2017 |
| JP | 2018-523022 | A | 8/2018 |
| JP | 2018-532682 | A | 11/2018 |
| JP | 2018-535178 | A | 11/2018 |
| JP | 2018-204725 | A | 12/2018 |
| JP | 2018-537311 | A | 12/2018 |
| JP | 2018-537383 | A | 12/2018 |
| JP | 2018-538224 | A | 12/2018 |
| JP | 2021-523869 | A | 9/2021 |
| KR | 10-2001-0104372 | A | 11/2001 |
| KR | 10-0372823 | B1 | 2/2003 |
| KR | 10-0385829 | B1 | 10/2003 |
| KR | 10-0710887 | B1 | 4/2007 |
| KR | 10-2007-0114668 | A | 12/2007 |
| KR | 10-0831877 | B1 | 5/2008 |
| KR | 10-2010-0053350 | A | 5/2010 |
| KR | 10-2010-0133268 | A | 12/2010 |
| KR | 10-2011-0067163 | A | 6/2011 |
| KR | 10-2011-0082379 | A | 7/2011 |
| KR | 10-2011-0126381 | A | 11/2011 |
| KR | 10-2012-0012836 | A | 2/2012 |
| KR | 10-1147494 | B1 | 5/2012 |
| KR | 10-2012-0070948 | A | 7/2012 |
| KR | 10-1176137 | B1 | 8/2012 |
| KR | 10-2014-0120721 | A | 10/2014 |
| KR | 10-1498562 | B1 | 3/2015 |
| KR | 10-2016-0101330 | A | 8/2016 |
| KR | 2017-0031011 | A | 3/2017 |
| KR | 10-2017-0063800 | A | 6/2017 |
| KR | 10-2017-0086831 | A | 7/2017 |
| KR | 10-2017-0096513 | A | 8/2017 |
| KR | 10-2017-0096514 | A | 8/2017 |
| KR | 10-2017-0098003 | A | 8/2017 |
| KR | 10-2017-0098592 | A | 8/2017 |
| KR | 10-2017-0112985 | A | 10/2017 |
| KR | 10-2018-0029235 | A | 3/2018 |
| KR | 10-2018-0033064 | A | 4/2018 |
| KR | 2018-0132723 | A | 12/2018 |
| KR | 10-2019-0008007 | A | 1/2019 |
| KR | 10-1953349 | B1 | 2/2019 |
| KR | 20190021956 | A | 3/2019 |
| KR | 10-1953347 | B1 | 5/2019 |
| KR | 10-2019-0063799 | A | 6/2019 |
| KR | 10-2019-0065325 | A | 6/2019 |
| KR | 10-2019-0078765 | A | 7/2019 |
| KR | 10-2019-0098728 | A | 8/2019 |
| KR | 10-2023531 | B1 | 9/2019 |
| KR | 10-2020-0063084 | A | 6/2020 |

(56) References Cited

FOREIGN PATENT DOCUMENTS

| | | | |
|---|---|---|---|
| WO | 2016/054524 | A2 | 4/2016 |
| WO | WO-2017145359 | A1 * | 8/2017 |
| WO | 2017/171217 | A1 | 10/2017 |
| WO | 2018/208005 | A1 | 11/2018 |
| WO | 2019/039841 | A1 | 2/2019 |
| WO | 2019/098519 | A1 | 5/2019 |
| WO | 2019/107706 | A1 | 6/2019 |
| WO | 2021/045483 | A1 | 3/2021 |

OTHER PUBLICATIONS

Machine translation of WO-2017145359-A1 (Year: 2017).*

Ma et al., "Preparation and Low-temperature Properties of Fiber Reinforced SiO2 Aerogel Composites," Materials Review, 2015, vol. 29, No. 10, pp. 43-46 (see English abstract).

Zhang et al., "Hygrothermal performance of silica aerogel composite for thermal insulation material," New Building Materials, 2017, No. 3, pp. 67-71 (see English abstract).

Iswar et al., "Effect of aging on silica aerogel properties," 2017, Microporous and Mesoporous Materials, vol. 241, p. 293-302.

Yokogawa et al., "Hydrophobic silica aerogels," 1995, Journal of Non-Crystalline Solids, vol. 186, p. 23-29.

Final Office Action issued Sep. 11, 2023 for counterpart U.S. Appl. No. 17/425,906.

Non-Final Office Action issued Oct. 19, 2023 for counterpart U.S. Appl. No. 17/416,619.

Final Office Action issued Nov. 2, 2023 for counterpart U.S. Appl. No. 17/429,116.

Extended European search report issued in corresponding European Patent Application No. 20861673.0 dated Dec. 1, 2021.

Extended European search report issued in corresponding European Patent Application No. 20860326.6 dated Jan. 4, 2022.

Extended European search report issued in corresponding European Patent Application No. 20860342.3 dated Jan. 21, 2022.

Office Action issued in the corresponding U.S. Appl. No. 17/425,906, dated Apr. 12, 2023.

Office Action issued in the corresponding U.S. Appl. No. 17/621,830, dated May 23, 2023.

Rao et al., "Synthesis and Characterization of Hydrophobic TMES/TEOS Based Silica Aerogels," Journal of Porous Materials, 2003, pp. 23-29, Maharashtra State, India.

Extended European Search Report issued in corresponding European Patent Application No. 20860200.3 dated Sep. 27, 2022.

Extended European Search Report issued in corresponding European Patent Application No. 20859770.8 dated Sep. 30, 2022.

Aspen Aerogel, AR5100, Vibration Testing Report, Feb. 4, 2003.

International Search Report (with partial translation) and Written Opinion dated Dec. 21, 2020, issued in corresponding International Patent Application No. PCT/KR2020/011710.

Lee, et al. "Super-insulating, flame-retardant, and flexible poly(dimethylsiloxane) composites based on silica aerogel," Composites Part A: Applied Science and Manufacturing, vol. 123, p. 108-113, 2019 https://doi.org/10.1016/j.compositesa.2019.05.004.

Non-Final Office Action issued on Feb. 20, 2024 for U.S. Appl. No. 17/429,116.

* cited by examiner

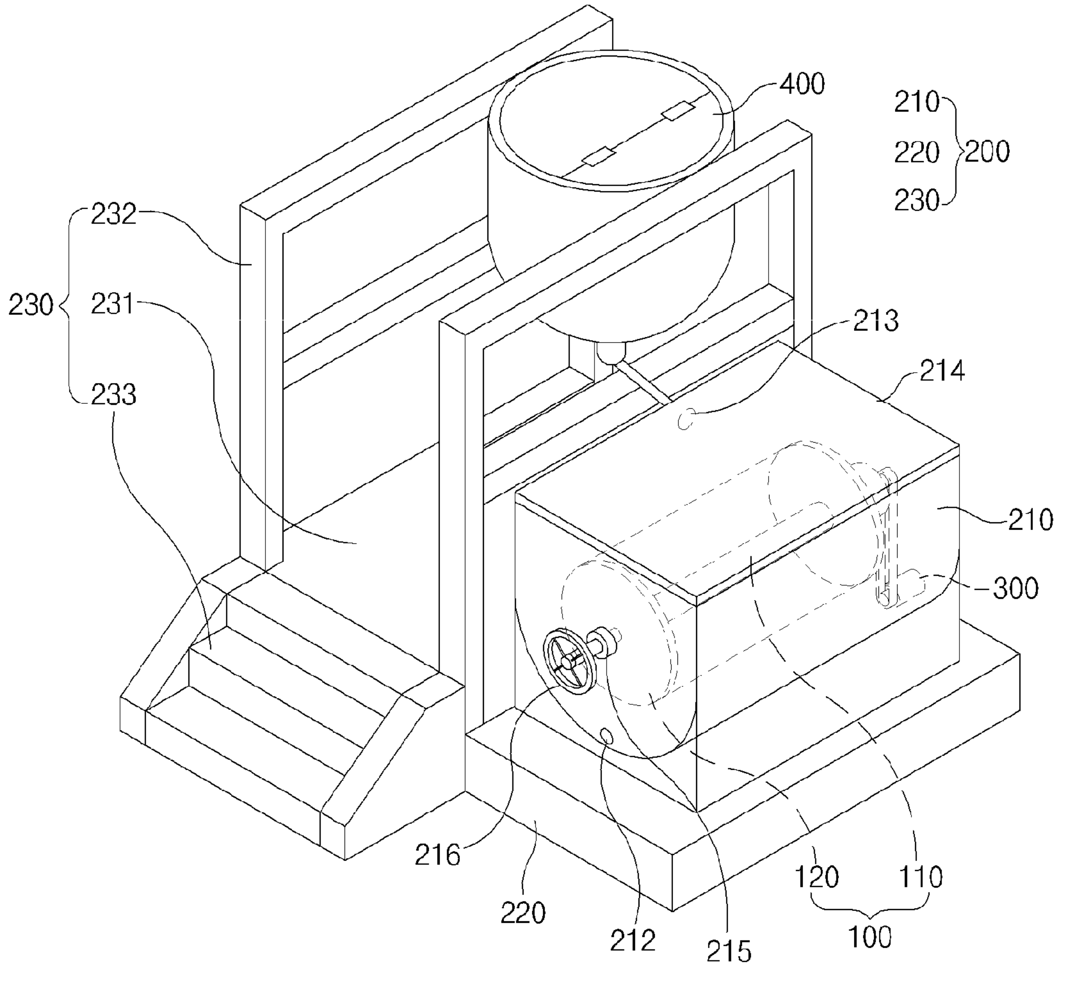
400
210
220
200
230
232
230
231
233
213
214
210
300
216
220
212
215
120
110
100

AEROGEL BLANKET

TECHNICAL FIELD

Cross-Reference to Related Applications

This application claims the benefit of Korean Patent Application Nos. 10-2019-0109158, filed on Sep. 3, 2019, 10-2019-0121123, filed on Sep. 30, 2019, 10-2019-0121147, filed on Sep. 30, 2019, and 10-2020-0084763, filed on Jul. 9, 2020, in the Korean Intellectual Property Office, each of which is incorporated by reference herein, in their entirety.

TECHNICAL FIELD

The present invention relates to an aerogel blanket which has excellent long-term water repellency, and thus, may maintain the thermal insulation performance thereof even under harsh conditions which may cause prolonged exposure to moisture.

BACKGROUND ART

An aerogel is a superporous, high specific surface area (≥500 $m^2/g$) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as environmentally friendly high-temperature thermal insulation materials, ultra-low dielectric thin films for highly-integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/mK or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is produced by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional thermal insulation material which prevents corrosion by moisture, and is widely used in construction or industrial fields. In general, such a hydrophobic silica aerogel blanket is manufactured through steps of silica sol solution preparation, gelation, aging, surface modification, and drying.

However, since a surface modification reaction by the surface modification step starts from the outermost part of an aerogel, there is a problem in that it is difficult for a sufficient amount of surface modifier to be introduced into the aerogel. Under harsh conditions in which the aerogel is exposed to moisture for a long period of time, this causes the degradation in thermal insulation performance since moisture penetrates into the inside of the aerogel eventually, and moisture adsorption due to the hydrogen bonding between a hydroxy group present on the surface of the inside of the aerogel and the moisture occurs thereby, which degrades the durability of the aerogel.

PRIOR ART DOCUMENT

Patent Document (Patent Document 1) KR10-2012-0070948A

DISCLOSURE OF THE INVENTION

Technical Problem

An aspect of the present invention provides an aerogel blanket which has excellent long-term water repellency, and thus, may maintain the thermal insulation performance thereof even under harsh conditions which may cause prolonged exposure to moisture, in order to prevent the Corrosion Under Insulation (CUI) of an aerogel.

Technical Solution

According to an aspect of the present invention, there is provided an aerogel blanket having a moisture impregnation rate of 28 days (MIR-28D) of 100 wt % or less, which is calculated by Equation 1 below.

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100 [Equation 1]

Advantageous Effects

An aerogel blanket according to the present invention has excellent long-term water repellency, and thus, may maintain the thermal insulation performance thereof even under harsh conditions which may cause prolonged exposure to moisture.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a perspective view showing an aerogel blanket manufacturing device of the second aspect of a method for manufacturing an aerogel blanket according to an embodiment of the present invention.

MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The "long-term water repellency" defined in the present invention means water repelling capability determined from increased weight of moisture absorbed by an aerogel blanket when the aerogel blanket is exposed to a moisture environment for a long period of time. The "long-term" may mean a period of time longer than 7 days (168 hours; 1 week), and may specifically mean 28 days (672 hours; 4 weeks) defined in the ISO:16535(Thermal insulating products for building applications—Determination of long-term water absorption by immersion; Method 2: total immersion). Accordingly, in the present invention, the water repelling capability determined from increased weight of moisture absorbed by an aerogel blanket when the aerogel blanket is exposed to a moisture environment for a long period of time is represented by a moisture impregnation rate of 28 days (MIR-28D) calculated by Equation 1 below, and the lower the moisture impregnation rate of 28 days, the better the long-term water repellency.

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100 [Equation 1]

In addition, the "mid-term water repellency" defined in the present invention means water repelling capability determined from increased weight of moisture absorbed by an aerogel blanket when the aerogel blanket is exposed to a moisture environment for a medium period of time. The "mid-term" may mean a period of time shorter than 7 days (168 hours; 1 week), and may specifically mean 96 hours (4 days) defined in the ASTM C1104(Standard Test Method for Determining the Water Vapor Sorption of Unfaced Mineral Fiber Insulation). Accordingly, in the present invention, the water repelling capability determined from increased weight of moisture absorbed by an aerogel blanket when the aerogel blanket is exposed to a moisture environment for a medium period of time is represented by a moisture impregnation rate of 96 hours (MIR-96H) calculated by Equation 2 below, and the lower the moisture impregnation rate of 96 hours, the better the mid-term water repellency.

Moisture impregnation rate of 96 hours (MIR-96H, wt %)={(Aerogel blanket weight after impregnation in distilled water of 21±2° C. for 96 hours−Aerogel blanket weight before impregnation in distilled water)/Aerogel blanket weight before impregnation in distilled water}×100 [Equation 2]

In addition, the "short-term water repellency" defined in the present invention means water repelling capability determined from increased weight of moisture absorbed by an aerogel blanket when the aerogel blanket is exposed to a moisture environment for a short period of time. The "short-term" may mean a period of time shorter than 1 day (24 hours), and may specifically mean 15 minutes (¼ hour) defined in the ASTM C1511(Standard Test Method for Determining the Water Retention (Repellency) Characteristics of Fibrous Glass Insulation). Accordingly, in the present invention, the water repelling capability determined from increased weight of moisture absorbed by an aerogel blanket when the aerogel blanket is exposed to a moisture environment for a short period of time is represented by a moisture impregnation rate of 15 minutes (MIR-15M) calculated by Equation 3 below, and the lower the moisture impregnation rate of 15 minutes, the better the short-term water repellency.

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 3]

As described above, a hydrophobic silica aerogel blanket in which a hydrophobic silica aerogel is formed in a fiber is a functional thermal insulation material which prevents corrosion by moisture, and is widely used in construction or industrial fields. Accordingly, the silica aerogel blanket is required to have excellent thermal insulation as well as water repellency to prevent the penetration of moisture into the aerogel in order to maintain the thermal insulation. In order to impart water repellency, a surface modification step of modifying the surface of the aerogel to be hydrophobic is performed to suppress the penetration of moisture into the aerogel blanket when manufacturing the aerogel blanket, and by the surface modification step, a hydrophobic group is introduced on the outermost surface of the aerogel to secure short-term water repellency. However, since a surface modification reaction by the surface modification step starts from the outermost part of the aerogel, there is a problem in that it is difficult for a sufficient amount of surface modifier to be introduced into the aerogel. Under harsh conditions in which the aerogel is exposed to moisture for a long period of time as well as a medium period of time, this causes the degradation in thermal insulation performance since moisture penetrates into the aerogel eventually, and moisture adsorption due to the hydrogen bonding between a hydroxy group present on the surface of the inside of the aerogel and the moisture occurs thereby, which degrades the durability of the aerogel.

Therefore, the present invention provides an aerogel blanket excellent in long-term water repellency by uniformly introducing a hydrophobic group both on the outermost surface of an aerogel and on the surface of the inside of the aerogel, thereby preventing the penetration of moisture into the aerogel. Specifically, the present invention provides an aerogel blanket excellent in short-term water repellency, mid-term water repellency, and long-term water repellency.

According to an embodiment of the present invention, the aerogel blanket may have a moisture impregnation rate of 28 days (MIR-28D) of 100 wt % or less, which is calculated by Equation 1 below.

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100 [Equation 1]

The moisture impregnation rate by Equation 1 above represents increased weight of an aerogel blanket increased by the impregnation of the aerogel blanket in distilled water for a long period of time. When the moisture impregnation rate of 28 days is maximum 100 wt % or lower, it can be seen that the durability of an aerogel may be prevented from being degraded by moisture adsorption due to the hydrogen bonding between a hydroxy group present on the surface of the inside of the aerogel and moisture. As in the present invention, in order to minimize a moisture impregnation rate of 28 days, a hydrophobic group is required to be uniformly introduced both on the outermost surface of an aerogel and on the surface of the inside of the aerogel, which may be implemented by a method for manufacturing an aerogel blanket according to the present invention to be described below.

According to an embodiment of the present invention, the aerogel blanket may have the moisture impregnation rate of 28 days (MIR-28D) of 90 wt % or less, 70 wt % or less, or 50 wt % or less, which is calculated by Equation 1 above. When in the above range, the long-term water repellency of the aerogel blanket is excellent, so that there is an effect of maximizing durability against moisture penetration.

According to an embodiment of the present invention, the aerogel blanket may have the moisture impregnation rate of 96 hours (MIR-96H) of 50 wt % or less, which is calculated by Equation 2 below.

Moisture impregnation rate of 96 hours (MIR-96H, wt %)={(Aerogel blanket weight after impregnation in distilled water of 21±2° C. for 96 hours−Aerogel blanket weight before impregnation in distilled water)/Aerogel blanket weight before impregnation in distilled water}×100 [Equation 2]

The moisture impregnation rate by Equation 2 above represents increased weight of an aerogel blanket increased by the impregnation of the aerogel blanket in distilled water for a medium period of time. When the moisture impregnation rate of 96 hours is maximum 50 wt % or lower, as in the case of the moisture impregnation rate of 28 days calculated by Equation 1 above, there is an effect of preventing the durability of an aerogel from being degraded by moisture adsorption due to the hydrogen bonding between a hydroxy group present on the surface of the inside of the aerogel and moisture. As in the present invention, in order to minimize a moisture impregnation rate of 96 hours, a hydrophobic group is required to be uniformly introduced both on the outermost surface of an aerogel and on the surface of the inside of the aerogel, which may be implemented by a method for manufacturing an aerogel blanket according to the present invention to be described below.

According to an embodiment of the present invention, the aerogel blanket may have the moisture impregnation rate of 96 hours (MIR-96H) of 45 wt % or less, or 40 wt % or less, which is calculated by Equation 2 above. When in the above range, the mid-term water repellency and long-term water repellency of the aerogel blanket is excellent, so that there is an effect of maximizing durability against moisture penetration.

According to an embodiment of the present invention, the aerogel blanket may have the moisture impregnation rate of 15 minutes (MIR-15M) of 20 wt % or less, which is calculated by Equation 3 below.

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 3]

The moisture impregnation rate by Equation 3 above represents increased weight of an aerogel blanket increased by the impregnation of the aerogel blanket in distilled water for a short period of time. When the moisture impregnation rate of 15 minutes is maximum 20 wt % or lower, a hydrophobic group is sufficiently introduced on the outermost surface of an aerogel, so that there is an effect of preventing moisture from penetrating into the aerogel blanket in an environment in which the aerogel blanket is exposed to moisture.

According to an embodiment of the present invention, the aerogel blanket may have the moisture impregnation rate of 15 minutes (MIR-15M) of 15 wt % or less, 10 wt % or less, 5 wt % or less, 3 wt % or less, or 1.5 wt % or less, which is calculated by Equation 3 above. When in the above range, the short-term water repellency of the aerogel blanket is excellent, so that there is an effect of maximizing the prevention of moisture penetration into an aerogel.

According to an embodiment of the present invention, the aerogel blanket may have the moisture impregnation rate of 28 days (MIR-28D) calculated by Equation 1 above and the moisture impregnation rate of 15 minutes (MIR-15M) calculated by Equation 3 above satisfying Equation 4 below.

$$(\text{MIR-28D})-(\text{MIR-15M})\leq 100 \quad \text{[Equation 4]}$$

Equation 4 above may be to determine whether an aerogel blanket may secure sufficient water repellency from the relationship between the long-term repellency and short-term repellency of the aerogel blanket. Specifically, even the moisture impregnation rate of 15 minutes (MIR-15M) which represents the short-term water repellency of an aerogel blanket and which is calculated by Equation 3 above is low, so that it can be seen that a hydrophobic group is sufficiently introduced on the outermost surface of an aerogel to prevent moisture from penetrating into the aerogel blanket in an environment in which the aerogel blanket is exposed to moisture, if the aerogel blanket is continuously exposed to moisture for a long period of time, it cannot be seen that it is possible to prevent the penetration of all moisture. Therefore, if the moisture impregnation rate of 28 days (MIR-28D) which represents the long-term water repellency of an aerogel blanket and which is calculated by Equation 1 above rapidly increases with respect to the moisture impregnation rate of 15 minutes which represents the short-term water repellency of the aerogel blanket and which is calculated by Equation 3 above, it cannot be seen that a hydrophobic group is uniformly introduced both on the outermost surface of an aerogel and on the surface of the inside of the aerogel as in the present invention. That is, when an aerogel blanket satisfies Equation 4 above according to an embodiment of the present invention, there is an effect in that the aerogel blanket secures sufficient short-term water repellency, and at the same time, the durability of an aerogel is prevented from being degraded by moisture adsorption due to the hydrogen bonding between a hydroxy group present on the surface of the inside of the aerogel and moisture. As in the present invention, in order to satisfy Equation 4 above, a hydrophobic group is required to be uniformly introduced both on the outermost surface of an aerogel and on the surface of the inside of the aerogel, which may be implemented by a method for manufacturing an aerogel blanket according to the present invention to be described below.

According to an embodiment of the present invention, the aerogel blanket may have the moisture impregnation rate of 28 days (MIR-28D) calculated by Equation 1 above and the moisture impregnation rate of 15 minutes (MIR-15M) calculated by Equation 3 above satisfying Equation 5 below, Equation 6 below, Equation 7 below, Equation 8 below, or Equation 9 below. In this case, since the moisture impregnation rate of 28 days (MIR-28D) which represents the long-term water repellency and which is calculated by Equation 1 above is prevented from rapidly increasing with respect to the moisture impregnation rate of 15 minutes which represents the short-term water repellency and which is calculated by Equation 3 above, the short-term water repellency, mid-term water repellency, and long-term water repellency of the aerogel blanket are all excellent, so that there is an effect of maximizing durability against moisture penetration.

$$1 \le (MIR - 28D) - (MIR - 15M) \le 90 \quad \text{[Equation 5]}$$

$$1 \le (MIR - 28D) - (MIR - 15M) \le 80 \quad \text{[Equation 6]}$$

$$1 \le (MIR - 28D) - (MIR - 15M) \le 70 \quad \text{[Equation 7]}$$

$$1 \le (MIR - 28D) - (MIR - 15M) \le 60 \quad \text{[Equation 8]}$$

$$1 \le (MIR - 28D) - (MIR - 15M) \le 50 \quad \text{[Equation 9]}$$

According to an embodiment of the present invention, the aerogel blanket may have a dust generation amount of 3.0 wt % or less, which is calculated by Equation 10 below.

Dust generation amount(wt %)={(Aerogel blanket weight before vibration−Aerogel blanket weight after vibration of 18 Hz/6 mm)/Aerogel blanket weight before vibration}×100 [Equation 10]

The dust generation amount by Equation 10 above represents the content of dust which is light and small aerogel powder remaining in an aerogel blanket. An aerogel of the aerogel blanket is manufactured as a unit, but apart from the aerogel unit, dust, which is light and small aerogel powder, may be unavoidably generated during the manufacturing. When an aerogel blanket is constructed as a thermal insulation material and the like, such dust may cause the degradation in constructability, obstruct an operator's view, or may pose problems against the safety of the operator since there is a risk that the operator may inhale the dust. Therefore, according to an embodiment of the present invention, when the dust generation amount is maximum 3.0 wt % or less, there are effects in that the degradation in constructability due to remaining dust in an aerogel blanket may be prevented and the safety of an operator may be ensured.

According to an embodiment of the present invention, the aerogel blanket may have the dust generation amount of 2.0 wt % or less, 1.5 wt % or less, 1.0 wt % or less, 0.5 wt % or less, or 0.4 wt % or less, which is calculated by Equation 10 above. When in the above range, the dust generation amount of the aerogel blanket is reduced to the minimum, so that there is an effect of securing constructability and ensuring the safety of an operator.

According to an embodiment of the present invention, the aerogel blanket may have a room temperature(23±5° C.) thermal conductivity of 30.0 mW/mK or less. The room temperature thermal conductivity is to represent the thermal insulation of an aerogel blanket. When the room temperature thermal conductivity thereof is maximum 30.0 mW/mK or less, and when the aerogel blanket is used as a thermal insulation material, there is an effect of securing sufficient thermal insulation.

According to an embodiment of the present invention, the aerogel blanket may have a room temperature (23±5° C.) thermal conductivity of 25.0 mW/mK or less, or 20.0 mW/mK or less. When in the above range, there is an effect of securing the thermal insulation of an aerogel blanket to the maximum.

According to an embodiment of the present invention, the aerogel blanket includes an aerogel and a substrate for a blanket, wherein the aerogel may be formed inside and on the surface of the substrate for a blanket. As a specific example, the aerogel blanket may have a large amount of aerogel particles evenly formed inside and on the surface of a substrate for a blanket.

In addition, according to an embodiment of the present invention, the aerogel may include a hydrophobic group on the surface of the inside of the aerogel. As a specific example, the aerogel may have a hydrophobic group uniformly introduced both on the outermost surface of the aerogel and on the surface of the inside of the aerogel, which may be implemented by a method for manufacturing an aerogel blanket according to the present invention to be described below.

According to an embodiment of the present invention, the aerogel blanket may be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

In addition, the present invention provides a method for producing an aerogel blanket to manufacture the aerogel blanket.

In order to manufacture the aerogel blanket according to the present invention, it is necessary to include a manufacturing step of uniformly introducing a hydrophobic group both on the outermost surface of an aerogel and on the surface of the inside of the aerogel. Therefore, the present invention provides a method for manufacturing an aerogel blanket, the method necessarily including the manufacturing step and having a first aspect and a second aspect.

First Aspect of Method for Manufacturing Aerogel Blanket

A first aspect of the method for manufacturing an aerogel blanket according to the present invention includes 1) preparing a silica sol, 2) impregnating the silica sol into a substrate for a blanket, and 3) leaving the silica sol-substrate for a blanket composite to stand, wherein the silica sol includes a silica precursor composition and a catalyst composition, and the catalyst composition includes a hydrophobizing agent, a base catalyst, water, and an organic solvent, wherein the base catalyst may be included in an amount of 0.4 parts by weight to 1.0 part by weight based on 100 parts by weight of the silica sol.

In the first aspect of the method for manufacturing an aerogel blanket according to an embodiment of the present invention, the silica sol may be a precursor which may eventually prepare a silica aerogel through a gelation reaction, or may be prepared by mixing a silica precursor composition and a catalyst composition.

In the first aspect of the method for manufacturing an aerogel blanket according to an embodiment of the present invention, the silica precursor composition may include a silica precursor, an organic solvent, and water. At this time, the silica precursor included in the silica precursor composition is a material for allowing a prepared aerogel to contain silica. As an example, one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondarybutyl ortho silicate, tetra tertiarybutyl ortho silicate, tetra hexyl ortho silicate, tetra cyclohexyl ortho silicate, and tetra dodecyl ortho silicate may be used, or a pre-hydrolysate of thereof may be used. When a pre-hydrolysate is used, the addition of an acid is not required, a process of hydrolyzing a silica precursor may be shortened or omitted, and an effect of surface modification may be promoted. More specifically, in the present invention, as the silica precursor (HTEOS), a pre-hydrolyzed polyethyl silicate may be used.

Here, the HTEOS is a pre-hydrolyzed ethyl polysilicate oligomer material having a wide molecular weight distribution, and when synthesized into an oligomer form from a TEOS monomer by varying the degree of prehydrolysis (degree of hydration), physical properties such as gelation time may be adjusted, and thus, may be easily applied according to user's reaction conditions. In addition, there is an advantage in that reproducible physical properties of a final product may be created.

In the first aspect of the method for manufacturing an aerogel blanket according to an embodiment of the present invention, the silica precursor may be used in an amount which allows the content of silica contained in the silica sol to be 0.1 wt % to 30 wt %, but the amount of the silica precursor to be used is not limited thereto. When the content of silica satisfies the above range, it is preferable in terms of obtaining mechanical physical properties of an aerogel blanket, the flexibility thereof in particular, to an excellent level and also having an improved thermal insulation effect.

In the first aspect of the method for manufacturing an aerogel blanket according to an embodiment of the present invention, the organic solvent may specifically be an alcohol. At this time, the alcohol may be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. Among the above, when considering the miscibility with water and an aerogel, the alcohol may be a monohydric alcohol having 1-6 carbon atoms such as methanol, ethanol, isopropanol, and butanol, and may be, for example, ethanol. The alcohol (an organic solvent) as described above and water may be used in an appropriate amount by those skilled in the art in consideration of the degree of hydrophobicity in an aerogel to be finally produced while promoting a surface modification reaction.

In the first aspect of the method for manufacturing an aerogel blanket according to an embodiment of the present invention, the catalyst composition is characterized by including a hydrophobizing agent, a base catalyst, water, and an organic solvent, wherein the base catalyst is included in an amount of 0.4 parts by weight to 1.0 part by weight based on 100 parts by weight of the silica sol.

In the first aspect of the method for manufacturing an aerogel blanket according to an embodiment of the present invention, the catalyst composition includes water together with a hydrophobizing agent in the composition, and thus, may activate the hydrophobizing agent included in the catalyst composition, and as the hydrophobizing agent is activated, aging and surface modification may be performed without using an aging solution and a surface modification solution, separately. Here, the activation of a hydrophobizing agent may mean that a functional group of the hydrophobizing agent other than an alkyl group, such as an alkoxy group, a halogen group, and the like are subjected to a hydrolysis reaction, thereby forming a hydroxyl group (—OH) at the position of the functional group. When the hydrophobizing agent is activated, reactivity with an —Si—O— functional group forming a network structure in a silica wet gel may be greatly increased, so that the hydrophobizing agent and the silica wet gel may react with each other without a separate additional catalyst and a solvent to achieve structure enhancement or surface modification. In addition, there is an effect of improving the long-term water repellency of the aerogel blanket, accordingly.

In the first aspect of the method for manufacturing an aerogel blanket according to an embodiment of the present invention, when the catalyst composition includes a hydrophobizing agent but not water, the hydrophobizing agent cannot be activated. Therefore, in order to achieve aging and surface modification afterwards, aging and surface modification processes which require a large amount of solvent shroud be performed under high temperature conditions as in a typical method, and there may still be a problem in which aging and surface modification reactions do not occur even if left to stand under room temperature conditions. Accordingly, structure enhancement is not achieved, so that shrinkage of a gel structure may occur during drying, and since there is no surface modification reaction, there may be a problem in that a hydrophobic silica aerogel blanket is not manufactured.

In the first aspect of the method for manufacturing an aerogel blanket according to an embodiment of the present invention, an alkyl silane compound may be used as the hydrophobizing agent, in which case the hydrophobizing agent may participate in a gelation reaction as a co-precursor, and may hydrophobize a formed silica wet gel blanket. Since an alkyl silane compound may be gelled with a silica precursor in a gelation step, or an alkyl silane compound trapped in a gel may be subjected to aging or surface modification in a step of leaving and form an alkyl-Si—O—Si network to hydrophobize a silica wet gel blanket, a surface modification step may be omitted when manufacturing a hydrophobic silica aerogel blanket. As a result, the amount of an organic solvent and a surface modifier to be used in a surface modification step may be reduced, and process time and manufacturing cost may be reduced. In addition, the amount of ammonia generated when the surface of a silica wet gel is surface-modified may be greatly reduced, so that the reuse efficiency of waste liquid generated after manufacturing the silica aerogel blanket may be increased, and when reusing the waste liquid, a hydrophobizing agent component included in the waste liquid may be included in a silica sol again, so that the amount of a hydrophobizing agent to be used may also be greatly reduced by the reuse.

Here, a hydrophobizing agent may specifically be an alkyl silane compound as described above, and as long as it is an alkyl silane compound containing an alkyl group inducing hydrophobization and a silane functional group capable of reacting with an —Si—O-functional group of a wet gel, the type thereof is not limited. More specifically, the hydrophobizing agent may include one more selected from the group consisting of trimethylethoxysilane (TMES), trimethylsilanol (TMS), trimethylchlorosilane (TMCS), methyltrimethoxysilane (MTMS), methyltrimethoxysilane (MTES), dimethyldiethoxysilane (DMDEOS), ethyltriethoxysilane, and phenyltriethoxysilane.

In addition, in the first aspect of the method for manufacturing an aerogel blanket according to an embodiment of the present invention, it may be more preferable that the hydrophobizing agent does not contain a silazane-based compound such as hexamethyldisilazane. When a silazane-based compound is included, the silazane-based compound may start to decompose when it comes into contact with an organic solvent and generate ammonia, so that as soon as the silazane-based compound is introduced into a catalyst composition including an organic solvent, a high pH may be formed due to the generation of ammonia, which may immediately start a gelation reaction. Therefore, in terms of preventing an unexpected gelation reaction and easily controlling gelation time by varying a catalyst amount, it is preferable not to include a silazane-based compound.

In addition, in the first aspect of the method for manufacturing an aerogel blanket according to an embodiment of the present invention, the hydrophobizing agent may be included in an amount of 3 to 15 parts by weight, specifically 5 to 10 parts by weight, and more specifically 6 to 8 parts by weight based on 100 parts by weight of a silica sol. When in the above range, hydrophobization efficiency (surface modification efficiency) compared to the amount used may be further improved.

In addition, in the first aspect of the method for manufacturing an aerogel blanket according to an embodiment of the present invention, the catalyst composition may include 3 equivalents to 8 equivalents of water based on 1 equivalent of a hydrophobizing agent. Specifically, the water may be included in an amount of 4 equivalents to 8 equivalents, more preferably 5 equivalents to 6 equivalents based on 1 equivalent of a hydrophobizing agent. When the water is included in an amount of 3 equivalents or more based on 1 equivalent of a hydrophobizing agent, the hydrophobizing agent may be sufficiently activated, so that the structure enhancement and surface modification of a wet gel may be easily achieved without an additional catalyst, a surface modifier, and a solvent. Accordingly, it is preferable since even when wet aging and a separate surface modification process which require high-temperature temperature conditions and a large amount of an organic solvent and a surface modifier are not performed, a silica aerogel blanket having excellent hydrophobicity may be manufactured. In addition, when the water is included in an amount of 8 equivalents or less based on 1 equivalent of a hydrophobizing agent, the amount of water in a wet gel blanket may be controlled. Accordingly, water is effectively removed in a supercritical drying process to suppress the shrinkage of an aerogel due to the water, so that thermal conductivity and hydrophobicity may be further improved.

In addition, in the first aspect of the method for manufacturing an aerogel blanket according to an embodiment of the present invention, the base catalyst may be included in an amount of 0.4 parts by weight to 1.0 part by weight, specifically 0.6 parts by weight to 1.0 parts by weight, and more specifically 0.6 parts by weight to 0.8 parts by weight based on 100 parts by weight of the entire silica sol. When a base catalyst is included in an amount of less than 0.4 parts by weight, in the process of leaving in Step 3), the reactivity between a hydrophobizing agent and the surface of a silica gel is weak, which may cause a problem in that surface modification is not achieved. When included in an amount of greater than 1.0 part by weight, there may be problems in that a gelation rate is too high, so that it may be difficult to prepare a uniform gel, and also, physical properties may be degraded due to the formation of the non-uniform gel.

In the first aspect of the method for manufacturing an aerogel blanket according to an embodiment of the present invention, the base catalyst may be used without limitation as long as it is a material which may allow the formation of a pH condition for achieving gelation. For example, the basic catalyst may be an inorganic base such as sodium hydroxide and potassium hydroxide, or an organic base such as ammonium hydroxide.

Specifically, the organic base may be ammonium hydroxide ($NH_4OH$), tetramethylammonium hydroxide (TMAH), tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, or dibutanol, and a mixture of two or more thereof may be used. More specifically, the base catalyst may be ammonium hydroxide (ammonia water; $NH_4OH$).

In addition, in the first aspect of the method for manufacturing an aerogel blanket according to an embodiment of the present invention, the organic solvent is the same as described above, and the amount of the organic solvent to be used may be appropriately adjusted in consideration of compatibility with water and a wet gel, and ease of structure enhancement and surface modification.

In addition, in the first aspect of the method for manufacturing an aerogel blanket according to an embodiment of the present invention, the catalyst composition may be included in an amount which allows the pH of a silica sol to be 4 to 8. When included in an amount which allows the pH of a silica sol to satisfy the above range, gelation may be easily and efficiently achieved. In addition, the catalyst composition is added in a liquid phase in which a base catalyst is diluted in water and an organic solvent, so that it is possible to prevent the problem in that the catalyst is precipitated.

A method for manufacturing an aerogel blanket according to the first aspect of the method for manufacturing an aerogel blanket according to an embodiment of the present invention includes 1) preparing a silica sol, 2) impregnating the silica sol into a substrate for a blanket, and 3) leaving the silica sol-substrate for a blanket composite to stand, wherein the silica sol is the above-described silica sol.

In the first aspect of the method for manufacturing an aerogel blanket according to an embodiment of the present invention, Step 1) is a step for preparing a silica sol, and may be performed by mixing a silica precursor composition and a catalyst composition. At this time, the silica sol, the silica precursor composition, and the catalyst composition are all the same as described above. In addition, the mixing of a silica precursor composition and a catalyst composition may be performed under the conditions of room temperature and atmospheric pressure.

In the first aspect of the method for manufacturing an aerogel blanket according to an embodiment of the present invention, since the above-described silica sol is prepared in Step 1), even when the silica sol-substrate for a blanket composite are left to stand without an additional base catalyst, a surface modifier, and an organic solvent in Step 3), structure enhancement and surface modification may be achieved.

In the first aspect of the method for manufacturing an aerogel blanket according to an embodiment of the present invention, Step 2) is a step for forming a silica sol-substrate for a blanket composite, and may be performed by impregnation the silica sol of Step 1) into a substrate for a blanket.

In the first aspect of the method for manufacturing an aerogel blanket according to an embodiment of the present invention, the substrate for a blanket may specifically be a porous substrate in terms of improving the thermal insulation properties of a silica aerogel blanket. When a porous substrate for a blanket is used, a silica sol is allowed to easily penetrate into the substrate, and thus, forms an aerogel uniformly inside the substrate for a blanket, so that a silica aerogel blanket manufactured may have excellent thermal insulation properties.

In the first aspect of the method for manufacturing an aerogel blanket according to an embodiment of the present invention, the blanket substrate may be a film, a sheet, a net, a fiber, a porous body, a foam, a non-woven body, or a laminate of two or more layers thereof. Also, according to the use of the blanket substrate, surface roughness may be formed or patterned on the surface thereof. Specifically, the blanket substrate may be a fiber capable of further improving thermal insulation performance by including a space or a void which allows an aerogel to be easily formed inside the blanket substrate, and may have low thermal conductivity.

In the first aspect of the method for manufacturing an aerogel blanket according to an embodiment of the present invention, the blanket substrate may be polyamide, polybenzimidazole, polyaramid, an acryl resin, a phenol resin, polyester, polyetheretherketone (PEEK), polyolefin (polyethylene, polypropylene, a copolymer thereof, or the like), cellulose, carbon, cotton, wool, hemp, a non-woven fabric, a glass fiber, ceramic wool, or the like.

In the first aspect of the method for manufacturing an aerogel blanket according to an embodiment of the present invention, Step 3) is a step for leaving the silica sol-substrate for a blanket composite to stand, and gelation, aging, and surface modification may be performed in Step 3).

In addition, in the first aspect of the method for manufacturing an aerogel blanket according to an embodiment of the present invention, since the silica sol of Step 1) described above is used, aging and surface modification may be easily achieved after gelation without using a separate surface modification solution and an aging solution (a base catalyst and a solvent). Since wet aging, and a surface modification process using a separate surface modification solution are not performed as described above, the amount of a solvent to be used and the amount of a surface modifier to be used may be greatly reduced compared to a typical silica aerogel blanket manufacturing process. In addition, since a base catalyst component included in the wet aging and the generation amount of ammonia generated from a surface modification reaction may be significantly lowered, the amount of ammonia in waste liquid generated after manufacturing an aerogel blanket is reduced, so that the reuse efficiency of the waste liquid may be increased. In addition, there is an effect of improving the long-term water repellency of the aerogel blanket, accordingly.

In the first aspect of the method for manufacturing an aerogel blanket according to an embodiment of the present invention, Step 3) may be performed under room temperature conditions, and under the above temperature condition, aging and surface modification may be more easily achieved. In addition, the room temperature may specifically indicate a temperature of 15 to 30° C., or 15 to 25° C. In addition, Step 3) may be performed for 5 to 48 hours, preferably 10 to 38 hours, and more preferably 15 to 24 hours.

In addition, in the first aspect of the method for manufacturing an aerogel blanket according to an embodiment of the present invention, by adjusting the amount of a catalyst in a catalyst composition, gelation time may also be easily adjusted to manufacture a silica aerogel having intended physical properties. At this time, gelation time may preferably be adjusted to 1 to 25 minutes, specifically 5 minutes to 10 minutes.

In the first aspect of the method for manufacturing an aerogel blanket according to an embodiment of the present invention, gelation may be forming a network structure from a silica precursor material, wherein the network structure may be a planar mesh structure in which specific polygons having one or more types of atomic arrangement are linked to each other, or a structure in which specific polyhedrons share their vertices, edges, faces, etc., with each other to form a three dimensional skeleton structure.

In addition, in the first aspect of the method for manufacturing an aerogel blanket according to an embodiment of the present invention, a drying step may be further included after Step 3), wherein a silica wet gel blanket is dried to prepare a hydrophobic silica aerogel.

Meanwhile, in the first aspect of the method for manufacturing an aerogel blanket according to an embodiment of the present invention, a washing step may be further performed before the drying. The washing is a step for removing impurities (sodium ions, unreacted substances, by-products, and the like) generated during the reaction and residual ammonia, which may generate an ammonium carbonate salt by reacting with $CO_2$ during supercritical drying, and the like in order to obtain a hydrophobic silica aerogel with high purity, and may be performed by a dilution process or an exchange process using a non-polar organic solvent.

In the first aspect of the method for manufacturing an aerogel blanket according to an embodiment of the present invention, the drying step may be performed through a process for removing a solvent while maintaining the pore structure of an aged silica gel, and the drying step may be performed by supercritical drying. The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide. A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

In the first aspect of the method for manufacturing an aerogel blanket according to an embodiment of the present invention, the supercritical drying process performs a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40° C. to 80° C. at a predetermined temperature raising rate, specifically, 0.1° C./min to 1° C./min, and the pressure which is greater than a pressure at which carbon dioxide becomes to be a supercritical state, specifically, the pressure of 100 bar to 170 bar is maintained to allow the carbon dioxide to remain in the supercritical state for a predetermined amount of time, specifically for 20 minutes to 1 hour. In general, carbon dioxide becomes to be in a supercritical state at a temperature of 31° C. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

In the first aspect of the method for manufacturing an aerogel blanket according to an embodiment of the present invention, as a result of the above drying process, a blanket including a porous silica aerogel having nano-sized pores and/or a blanket including a porous silica aerogel may be manufactured. The silica aerogel has excellent physical properties, low tap density and high porosity in particular, together with a high degree of hydrophobicity, and a silica aerogel-containing blanket including the same has excellent mechanical flexibility together with low thermal conductivity.

In addition, in the first aspect of the method for manufacturing an aerogel blanket according to an embodiment of the present invention, before or after the drying process, a compression process to control the thickness and to make the internal structure and surface shape of a blanket uniform, a molding process to have a suitable shape or morphology according to use, or a lamination process for laminating a separate functional layer may be further performed.

Second Aspect of Method for Manufacturing Aerogel Blanket

A second aspect of the method for manufacturing an aerogel blanket according to the present invention includes 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation, wherein the catalyzed sol includes a silica precursor composition, and the silica precursor composition includes a silicate containing a hydrophobic group and a tetraalkyl silicate, wherein the molar ratio of the silicate containing a hydrophobic group and the tetraalkyl silicate is 60:40 to 98:2.

In the second aspect of the method for manufacturing an aerogel blanket according to an embodiment of the present invention, Step 1) is a step of preparation for forming an aerogel blanket, which is to impregnate a catalyzed sol into a substrate for a blanket, wherein a catalyzed sol may be prepared and then the prepared catalyzed sol and a substrate for a blanket may be introduced into a reaction vessel to impregnate the catalyzed sol into the substrate for a blanket.

In addition, in the second aspect of the method for manufacturing an aerogel blanket according to an embodiment of the present invention, in Step 1), as long as a substrate for a blanket and a catalyzed sol are introduced in a reaction vessel, the introduction order thereof is not particularly limited. Specifically, in Step 1), the introduction may be performed by any one method among a method for introducing a substrate for a blanket into a reaction vessel and then introducing a catalyzed sol, a method for introducing a catalyzed sol into a reaction vessel and then introducing a substrate for a blanket, and a method for introducing a substrate for a blanket while introducing a catalyzed sol into a reaction vessel. Among the above, in terms of achieving more uniform impregnation, the method for introducing a substrate for a blanket and then introducing a catalyzed sol may be more desirable. Specifically, when a substrate for a blanket is first introduced, the substrate for a blanket may be rotated when a catalyzed sol is introduced, so that more uniform impregnation may be induced.

In the second aspect of the method for manufacturing an aerogel blanket according to an embodiment of the present invention, in Step 1), the impregnation may be performed while rotating the substrate for a blanket as described above.

When impregnation is performed while rotating a substrate for a blanket, a catalyzed sol may uniformly come into contact with all surfaces of the substrate for a blanket to induce uniform impregnation, which is more desirable.

In the second aspect of the method for manufacturing an aerogel blanket according to an embodiment of the present invention, the catalyzed sol may be prepared by mixing a sol and a base catalyst, wherein the base catalyst serves to promote gelation in Step 2) by increasing the pH of the sol. At this time, the sol is not limited as long as it is a material capable of forming a porous gel by a sol-gel reaction, and specifically, may include an inorganic sol, an organic sol, or a combination thereof. The inorganic sol may include zirconia, yttrium oxide, hafnia, alumina, titania, ceria, silica, magnesium oxide, calcium oxide, fluorinated magnesium, fluorinated calcium, and combinations thereof, and the organic sol may be polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof. In addition, in terms of securing excellent miscibility with a substrate for a blanket, further improving porosity when being formed as a gel, and manufacturing an aerogel blanket having low thermal conductivity, the sol may be preferably a silica sol.

In the second aspect of the method for manufacturing an aerogel blanket according to an embodiment of the present invention, the sol contains a sol precursor, water, and an organic solvent, and may be prepared by mixing a sol precursor, water, and an organic solvent. When the catalyzed sol according to an embodiment of the present invention is a catalyzed silica sol, in Step 1), the catalyzed silica sol may be prepared by mixing a silica sol and a base catalyst, wherein the silica sol may be prepared by mixing a silica precursor composition, water, and an organic solvent. In addition, the silica sol may undergo hydrolysis at a low pH to facilitate gelation, and at this time, an acid catalyst may be used to lower a pH. A silica precursor composition which may be used for preparing the silica sol may include an alkoxide-based compound containing silicon, and specifically, may include a silicate containing a hydrophobic group and a tetraalkyl silicate.

In the second aspect of the method for manufacturing an aerogel blanket according to an embodiment of the present invention, the silicate containing a hydrophobic group is to impart hydrophobicity to an aerogel without a surface modification step when preparing the aerogel, and may be one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES). When a silicate containing a hydrophobic group is included in a silica precursor composition as described above, it is possible to omit a surface modification step, and accordingly, a regeneration process is not required when recycling a solvent. Also, since the hydrophobic group may be evenly introduced from the inside to the outside of the aerogel, hydrophobicity is maximized, and accordingly, water with high surface tension may be easily pushed out, so that it is possible to perform atmospheric drying in the following drying step. In addition, there is an effect of improving the long-term water repellency of the aerogel blanket, accordingly.

In the second aspect of the method for manufacturing an aerogel blanket according to an embodiment of the present invention, the tetraalkyl silicate is to reinforce the strength of an aerogel and to ensure thermal insulation performance, and may be a tetraalkyl silicate such as tetramethyl orthosilicate (TMOS), tetraethyl orthosilicate (TEOS), tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among the above, the silica precursor according to an embodiment of the present invention may more specifically be tetraethyl orthosilicate (TEOS).

In the second aspect of the method for manufacturing an aerogel blanket according to an embodiment of the present invention, the molar ratio of the silicate containing a hydrophobic group and the tetraalkyl silicate in the silica precursor composition may be 60:40 to 98:2. When in the above range, the strength and thermal insulation performance of an aerogel may be maximized when supercritical drying is performed. In addition, when atmospheric drying is performed, the molar ratio of the silicate containing a hydrophobic group and the tetraalkyl silicate in the silica precursor composition may be 85:15 to 98:2, or 90:10 to 98:2. When in the above range, the strength and thermal insulation performance of an aerogel may be secured with high efficiency, and also, a decrease in thermal insulation performance may be prevented by preventing shrinkage during the atmospheric drying. The silica precursor composition may be used in an amount which allows the content of silica ($SiO_2$) contained in the silica sol to be 3 wt % to 30 wt %, 5 wt % to 20 wt %, or 6 wt % to 12 wt %. When in the above range, a sufficient content of a silica aerogel may be secured in a blanket to be finally manufactured, so that a thermal insulation effect of a desired level may be expected. In addition, excessive formation of a silica aerogel is prevented, so that the degradation in the mechanical properties of the blanket, the flexibility thereof in particular, may be prevented.

In addition, in the second aspect of the method for manufacturing an aerogel blanket according to an embodiment of the present invention, as an organic solvent which may be used for preparing the sol, any material may be used without limitation as long as it has compatibility with a sol precursor and water. Specifically, a polar organic solvent may be used, and more specifically, an alcohol may be used. Here, the alcohol may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. Among these, when considering the miscibility thereof with water and an aerogel to be prepared, the alcohol may be a monohydric alcohol having 1-6 carbon atoms such as methanol, ethanol, isopropanol, and butanol. The organic solvent as described above may be used in an appropriate amount in consideration of the content of an aerogel to be finally prepared.

In the second aspect of the method for manufacturing an aerogel blanket according to an embodiment of the present invention, the silica sol may include a silica precursor composition and water in a molar ratio of 1:10 to 1:1. In addition, a silica precursor composition and an organic solvent may be included in a weight ratio of 1:2 to 1:9, and preferably, may be included in a weight ratio of 1:2 to 1:6. When a silica precursor composition satisfies the above molar ratio or weight ratio with water and an organic solvent, the production yield of aerogel may further increase, so that there is an effect of improving thermal insulation performance.

In addition, in the second aspect of the method for manufacturing an aerogel blanket according to an embodiment of the present invention, as the acid catalyst which may be further included in the sol, any acid catalyst which may allow a pH to be 3 or less may be used without limitation. As an example, hydrochloric acid, nitric acid, or sulfuric acid may be used. At this time, the acid catalyst may be added in an amount which allows the pH of the sol to be 3 or less, and may be added in the form of an aqueous solution dissolved in an aqueous solvent.

In addition, in the second aspect of the method for manufacturing an aerogel blanket according to an embodiment of the present invention, a base catalyst which may be used in the catalyzed sol may be an inorganic base such as sodium hydroxide and potassium hydroxide, or an organic base such as ammonium hydroxide. Specifically, the basic catalyst may be one or more selected from the group consisting of sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or a mixture thereof. The base catalyst may be included in an amount which allows the pH of the sol to be 7 to 11. If the pH of the sol is out of the above range, the gelation in Step 2) may not be easily achieved, or a gelation rate may be too low, so that processability may be degraded. In addition, since the base may be precipitated when introduced in a solid phase, it may be preferable that the base is added in the form of a solution diluted by an aqueous solvent or the above-described organic solvent. At this time, the dilution ratio of the base catalyst and the organic solvent, specifically an alcohol, may be 1:4 to 1:100 based on volume.

In the second aspect of the method for manufacturing an aerogel blanket according to an embodiment of the present invention, the catalyzed sol may further be added with an additive if necessary. At this time, as the additive, all known additives which may be added when manufacturing an aerogel may be applied, and for example, an additive such as an opacifying agent, flame retardant, and the like may be used. The substrate for a blanket may be introduced in an appropriate form which facilitates the introduction according to the shape of a reaction vessel. Specifically, a substrate for a blanket wound on a bobbin in the form of a roll may be introduced into the reaction vessel to facilitate the rotation in Step 2) to be described later. At this time, the bobbin can be a shaft capable of rotating the substrate for a blanket, and anything may be applied without limitation as long as it can wind the substrate for a blanket. As an example, a polygonal cylindrical column, preferably a cylindrical column having a size which may fit inside the reaction vessel may be used.

In addition, in the second aspect of the method for manufacturing an aerogel blanket according to an embodiment of the present invention, the bobbin may include a winding rod capable of winding the substrate for a blanket in the form of a roll, and a support plate which supports a side portion of the substrate for a blanket such that the substrate for a blanket wound on the winding rod is not displaced at the time of rotation. At this time, it is preferable that the winding rod has a number of hollows such that the catalyzed sol may be easily impregnated on the inside of the substrate for a blanket. Meanwhile, in order to allow the catalyzed sol to be introduced into the side portion of the substrate for a blanket, a mesh-type support plate may be used, or the support plate may include a number of hollows.

Any material having sufficient strength to support the blanket may be used as the material of the bobbin. Specifically, stainless steel, PE, PP, and Teflon may be used.

In the second aspect of the method for manufacturing an aerogel blanket according to an embodiment of the present invention, the bobbin may be placed into a reaction vessel and fixed after a substrate for a blanket is wound thereon. Here, the bobbin may be fixed at any position of the reaction vessel. However, in terms of introducing the substrate for a blanket in a large amount into the reaction vessel of a predetermined volume, thereby increasing production efficiency, the bobbin may preferably be fixed at a central portion of the reaction vessel. In addition, the bobbin may be positioned such that the long axis of the bobbin and the long axis of the reaction vessel are parallel to each other.

In addition, in the second aspect of the method for manufacturing an aerogel blanket according to an embodiment of the present invention, the substrate for a blanket may specifically be a porous substrate in terms of improving the thermal insulation properties of an aerogel blanket. When a porous substrate for a blanket is used, a catalyzed sol is allowed to easily penetrate into the substrate, and thus, forms an aerogel uniformly inside the substrate for a blanket, so that an aerogel blanket manufactured may have excellent thermal insulation properties.

The substrate for a blanket which may be used according to the second aspect of the method for manufacturing an aerogel blanket according to an embodiment of the present invention may be a film, a sheet, a net, a fiber, a foam, a non-woven body, or a laminate of two or more layers thereof. Also, according to the use of the substrate for a blanket, surface roughness may be formed or patterned on the surface thereof. More specifically, the substrate for a blanket may be a fiber capable of further improving thermal insulation performance by including a space or a void through which an aerogel may be easily inserted into the substrate for a blanket. Furthermore, the substrate for a blanket may preferably have low thermal conductivity.

In the second aspect of the method for manufacturing an aerogel blanket according to an embodiment of the present invention, the substrate for a blanket may be polyamide, polybenzimidazole, polyaramid, an acryl resin, a phenol resin, polyester, polyetheretherketone (PEEK), polyolefin (e.g., polyethylene, polypropylene, a copolymer thereof, or the like), cellulose, carbon, cotton, wool, hemp, a non-woven fabric, a glass fiber, ceramic wool, or the like. More specifically, the substrate for a blanket in the present invention may be a glass fiber.

In the second aspect of the method for manufacturing an aerogel blanket according to an embodiment of the present invention, the reaction vessel may be a reaction vessel for performing gelation, and a vessel in any shape such a polygon or a cylinder may be used as long as it is a vessel providing a space in which a substrate for a blanket into which a catalyzed sol is impregnated may rotate therein. However, a cylindrical reaction vessel may be preferably used in terms of facilitating the introduction of a substrate for a blanket wound in the form of a roll and the rotation of the substrate for a blanket into which a catalyzed sol is impregnated during a gelation reaction.

In the second aspect of the method for manufacturing an aerogel blanket according to an embodiment of the present invention, in Step 1), when the catalyzed sol is introduced, in order to improve the bonding of the substrate for a blanket and the catalyzed sol, the substrate for a blanket may be lightly pressed down to achieve sufficient impregnation. Thereafter, the substrate for a blanket may be pressed at a constant pressure to a predetermined thickness to remove excess sol, thereby shortening drying time. In another embodiment, when a catalyzed sol is introduced into a reaction vessel, and a substrate for a blanket is sufficiently impregnated so that the liquid level in the reaction vessel no longer changes, a drain valve connected to the reaction vessel may be opened to recover remaining sol.

In addition, in the second aspect of the method for manufacturing an aerogel blanket according to an embodiment of the present invention, the catalyzed sol and the substrate for a blanket may each be introduced in an amount, specifically in an amount of 1 to 100% of the internal volume of the reaction vessel, and in terms of shortening the gelation time in Step 3) and uniformly forming an aerogel inside the substrate for a blanket, may be introduced in an amount of 1 to 60% of the volume of the reaction vessel, more specifically 10 to 60%, even more preferably 30 to 60%, respectively.

In the second aspect of the method for manufacturing an aerogel blanket according to an embodiment of the present invention, the catalyzed sol may be introduced in an amount of 80 to 120%, preferably 90 to 110%, based on the volume of the substrate for a blanket. In addition, preferably, the introduction amount of the substrate for a blanket and the catalyzed sol may satisfy the above introduction ratio therebetween under the conditions satisfying the introduction amount with respect to the reaction vessel. When a catalyzed sol satisfies the introduction ratio (the introduction amount) with respect to the volume of a substrate for a blanket, the catalyzed sol is more uniformly impregnated on the substrate for a blanket, so that an aerogel blanket to be manufactured may have more uniform physical properties, and since the catalyzed sol may all be impregnated on the substrate for a blanket, it is possible to prevent the loss of raw materials and prevent a problem in which the catalyzed sol is gelled alone.

In the second aspect of the method for manufacturing an aerogel blanket according to an embodiment of the present invention, Step 2) is to manufacture a wet gel blanket composite (a wet gel blanket), and may be performed by rotating a substrate for a blanket into which a catalyzed sol is impregnated to be gelled.

In the second aspect of the method for manufacturing an aerogel blanket according to an embodiment of the present invention, the rotation of the substrate for a blanket into which a catalyzed sol is impregnated may be performed by any method or device as long as the method or device allows rotation during gelation in a reaction vessel. Specifically, when a substrate for a blanket is introduced and fixed while being wound on a bobbin in Step 1) above, the substrate for a blanket into which a catalyzed sol is impregnated is present in the reaction vessel while being wound on the bobbin, so that the substrate for a blanket into which a catalyzed sol is impregnated may be rotated by rotating the bobbin.

In the second aspect of the method for manufacturing an aerogel blanket according to an embodiment of the present invention, the gelation may be to form a network structure from a catalyzed sol, wherein the network structure may represent a planar mesh structure in which specific polygons having one or more types of atomic arrangement are linked to each other, or a structure in which specific polyhedrons share their vertices, edges, faces, and the like with each other to form a three-dimensional skeleton structure.

In the second aspect of the method for manufacturing an aerogel blanket according to an embodiment of the present invention, a gelation reaction may be performed after sealing a reaction vessel into which a catalyzed sol and a substrate for a blanket are introduced. In addition, according to an embodiment of the present invention, rotation may be performed by disposing a long axis in a lateral direction, that is, in a horizontal direction. If the reaction vessel (a main body) is a cylindrical reaction vessel, the cylindrical reaction vessel may be laid down and rotated. That is, the rotating axis of the reaction vessel of the present invention may be horizontal, but is not limited thereto.

In the second aspect of the method for manufacturing an aerogel blanket according to an embodiment of the present invention, the type of a device for manufacturing an aerogel blanket is not limited as long as it is a device including the reaction vessel (a main body) and capable of rotating the substrate for a blanket into which a catalyzed sol is impregnated present in the reaction vessel. Any device known in the art may be used as long as the device is capable of rotating. Specifically, any known device may be used as long as it is capable of fixing the position of a bobbin in a reaction vessel and rotating the bobbin whose position is fixed. An example of a device for manufacturing an aerogel blanket which may be applied in the present invention will be described later.

In addition, in the second aspect of the method for manufacturing an aerogel blanket according to an embodiment of the present invention, after Step 1) above is completed, Step 2) above may be initiated to sequentially perform Step 1) above and Step 2) above.

In the second aspect of the method for manufacturing an aerogel blanket according to an embodiment of the present invention, before Step 1) above is completed, Step 2) above may be initiated. When Step 2) is performed before the completion of Step 1) above as described above, all of the catalyzed sol may be introduced into the reaction vessel until gelation is completed, specifically before the completion of the gelation.

In the second aspect of the method for manufacturing an aerogel blanket according to an embodiment of the present invention, the rotation rate in Step 2) above may be applied without limitation as long as it is a rotation rate which allows an aerogel to uniformly form in a blanket. As an example, gelation may be performed while performing rotation at a rotation rate of 1 rpm to 300 rpm, preferably 5 rpm to 150 rpm, 5 rpm to 100 rpm, and more preferably 10 rpm to 30 rpm. When the reaction vessel satisfies the rotation rate in the above range, a sol may be evenly impregnated on a substrate for a blanket, so that an aerogel is more uniformly formed during gelation. Accordingly, it is possible to secure very uniform thermal conductivity throughout an aerogel blanket and there is an advantage in that the safety of a process for manufacturing the aerogel blanket by increasing the stability of a reaction vessel and an apparatus for rotating the reaction vessel.

In the second aspect of the method for manufacturing an aerogel blanket according to an embodiment of the present invention, a catalyzed sol and a substrate for a blanket are all put into a reaction vessel to be gelled, thereby manufacturing an aerogel blanket, so that unlike a roll-to-roll method, which has been typically applied, a moving element such as a conveyor belt is not separately required, and thus there is an advantage in that a space to be used during the manufacturing may be greatly reduced. In addition, as in the roll-to-roll method, when a substrate for a blanket is disposed on a moving element and then a catalyzed sol is applied on the substrate for a blanket, followed by continuously moving the moving element to perform gelation, the gelation is not simultaneously performed on the entire substrate for a blanket, but is sequentially performed over time while continuously supplying the substrate for a blanket and the catalyzed sol, so that there is a problem in that even if a substrate for a blanket having the same thickness and length is used, gelation takes much longer than the gelation process according to an embodiment of the present invention. Specifically, the longer the substrate for a blanket, the more noticeable the problem that gelation process time becomes longer in order to achieve sufficient gelation on the entire substrate for a blanket. However, according to an embodiment of the present invention, the gelation of a sol is simultaneously achieved on the entire substrate for a blanket, so that manufacturing time may be significantly reduced. In addition, the length and thickness of a substrate for a blanket do not affect gelation time, so that even if a long substrate for a blanket is used, manufacturing time may be significantly reduced to maximize process efficiency.

In addition, in the second aspect of the method for manufacturing an aerogel blanket according to an embodiment of the present invention, since gelation is performed while rotating a reaction vessel, centrifugal force and centripetal force are applied. Therefore, compared to a roll-to-roll method in which a reaction vessel is not rotated or gelation is performed on a moving element, an aerogel blanket in which an aerogel is more uniformly dispersed may be manufactured, so that the thickness of the manufactured aerogel blanket is the same or very similar to the thickness of a substrate for a blanket, and there is an effect in that thermal insulation properties are excellent.

In the second aspect of the method for manufacturing an aerogel blanket according to an embodiment of the present invention, an aging step may be performed as a process for allowing a chemical change to be completely achieved by leaving the wet gel blanket composite to stand at a suitable temperature. The aging step may more firmly form the formed network structure, and thus, may enhance the mechanical stability of the aerogel blanket of the present invention.

In the second aspect of the method for manufacturing an aerogel blanket according to an embodiment of the present invention, the aging step of the present invention may be performed by leaving the wet gel blanket composite to stand at a suitable temperature, or as an another example, may be performed by adding a solution in which a basic catalyst such as sodium hydroxide (NaOH), potassium hydroxide (KOH), ammonium hydroxide ($NH_4OH$), triethylamine, pyridine, or the like is diluted to a concentration of 1 to 10% in an organic solvent, in the presence of the wet gel blanket composite. In this case, a Si—O—Si bonding in an aerogel is induced to the maximum to allow the network structure of a silica gel to be more firm, so that there is an effect of facilitating the maintenance of the pore structure in a quick drying process to be performed later. At this time, the organic solvent may be the alcohol (a polar organic solvent) described above, and specifically, may include ethanol.

In addition, in the second aspect of the method for manufacturing an aerogel blanket according to an embodiment of the present invention, the aging step should be performed in a suitable temperature range to achieve optimal pore structure enhancement. The aging step of the present invention may be performed by leaving the wet gel blanket composite to stand for 1 to 20 hours at a temperature of 30 to 70° C., regardless of the introduction of a basic catalyst. When the aging temperature is below 30° C., aging time becomes excessively long, which may cause the total process time to increase, so that there may be problem in that productivity decreases. When the aging temperature is above 70° C., the temperature is out of the boiling point of ethanol, so that there may be a problem in that the loss of the solvent due to evaporation increases, which may cause raw material cost to increase.

In addition, in the second aspect of the method for manufacturing an aerogel blanket according to an embodiment of the present invention, the aging step may be performed in a separate reaction vessel after recovering a gelled silica wet gel blanket, or may be performed inside a reaction vessel in which gelation has been performed. In terms of the efficiency of a process and the simplification of equipment, the aging step may be preferably performed in the reaction vessel in which gelation has been performed. In addition, when the aging step is performed in the reaction vessel in which gelation has been performed, the wet gel blanket composite prepared in Step 3) may rotate, and when the aging is performed while the composite is rotating, an aging solvent may be penetrated better, and may be dispersed better in the wet gel blanket composite after the penetration. Therefore, there is an advantage in that aging efficiency may be greatly improved.

In addition, in the second aspect of the method for manufacturing an aerogel blanket according to an embodiment of the present invention, a solvent substitution step may be performed before a drying step for manufacturing an aerogel blanket from a wet gel blanket composite. Wet gel of the wet gel blanket composite has pores filled with a solvent containing water and/or an organic solvent. When a step for dying the wet gel blanket composite is performed to remove the solvent, the solvent in a liquid phase vaporizes into a gaseous phase, and due to the surface tension of the solvent at a gas/liquid interface, shrinkage and cracking occurs in the structure of the pores. As a result, the specific surface area decreases and the pore structure changes in a silica aerogel finally produced. Therefore, in order to maintain the pore structure of the wet gel, it is necessary to minimize the surface tension of the solvent, and to this end, it is necessary to have a process of substituting water having a high surface tension with a solvent having a low surface tension.

In the second aspect of the method for manufacturing an aerogel blanket according to an embodiment of the present invention, a solvent which may be mixed with a silica gel after gelation as the solvent to be substituted may be a hydrophilic polar organic solvent, and specifically, may be an alcohol. The alcohol may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. Among these, when considering the miscibility thereof with water and a hydrophobic aerogel, the alcohol may be a monohydric alcohol having 1-6 carbon atoms such as methanol, ethanol, isopropanol, and butanol.

In the second aspect of the method for manufacturing an aerogel blanket according to an embodiment of the present invention, a drying step for manufacturing an aerogel blanket from the wet gel blanket composite may be performed.

In the second aspect of the method for manufacturing an aerogel blanket according to an embodiment of the present invention, the drying step may be performed through a process for removing a solvent while maintaining the pore structure of an aged gel, and the drying step may be performed by a supercritical drying process or an atmospheric drying process.

In the second aspect of the method for manufacturing an aerogel blanket according to an embodiment of the present invention, the supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide. A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

In the second aspect of the method for manufacturing an aerogel blanket according to an embodiment of the present invention, the supercritical drying process performs a solvent substitution process in which an aged wet gel blanket is placed into a supercritical drying reactor, and then $CO_2$ in a liquid state is filled therein, followed by substituting an alcohol solvent inside the wet gel with $CO_2$. Thereafter, the temperature is raised to 40° C. to 70° C. at a predetermined temperature raising rate, specifically, 0.1° C./min to 1° C./min, and the pressure which is greater than a pressure at which carbon dioxide becomes to be a supercritical state, specifically, the pressure of 100 bar to 150 bar is maintained to allow the carbon dioxide to remain in the supercritical state for a predetermined amount of time, specifically for 20 minutes to 1 hour. In general, carbon dioxide becomes to be in a supercritical state at a temperature of 31° C. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

In addition, in the second aspect of the method for manufacturing an aerogel blanket according to an embodiment of the present invention, the atmospheric drying process may be performed according to a typical method such as hot air drying and IR drying under a temperature of 70 to 200° C. and an atmospheric pressure (1±0.3 atm).

In the second aspect of the method for manufacturing an aerogel blanket according to an embodiment of the present invention, as a result of the above drying process, a blanket including a porous aerogel having nano-sized pores may be manufactured. Particularly, the silica aerogel according to an embodiment of the present invention has excellent physical properties, low density and high porosity in particular, together with a high degree of hydrophobicity, and a silica aerogel-containing blanket including the same has excellent mechanical flexibility together with low thermal conductivity.

In addition, in the second aspect of the method for manufacturing an aerogel blanket according to an embodiment of the present invention, before or after the drying process, a compression process to control the thickness and to make the internal structure and surface shape of a blanket uniform, a molding process to have a suitable shape or morphology according to use, or a lamination process for laminating a separate functional layer may be further performed.

The present invention provides a device for manufacturing an aerogel blanket for implementing the second aspect of the method for manufacturing an aerogel blanket according to the embodiment of the present invention.

In the second aspect of the method for manufacturing an aerogel blanket according to an embodiment of the present invention, the device for manufacturing an aerogel blanket includes, as shown in FIG. 1, a bobbin 100 on which a blanket is to be wound, a main body 200 provided with a gelation tank 210 receiving the bobbin 100, a driving member 300 which rotates the bobbin 100 received in the gelation tank 210, a catalyzed sol supplying member 400 which injects a catalyzed sol into the gelation tank 210, an aging member (not shown) which injects an aging solution into the gelation tank 210, and a drying member (not shown) which dries the blanket by raising the temperature of the gelation tank 210. Here, a blanket may mean a substrate for a blanket before a catalyzed sol is introduced, a substrate for a blanket into which a catalyzed sol is impregnated and/or a wet gel blanket after gelation, and may appropriately interpreted depending on the state of a substrate for a blanket in each step.

In the second aspect of the method for manufacturing an aerogel blanket according to an embodiment of the present invention, the bobbin is for winding a blanket in a roll-form, and includes a winding rod on which the blanket is wound in a roll form, and a support plate which is coupled to each end of the winding rod and supports a side portion of the blanket wound on the winding rod.

In the second aspect of the method for manufacturing an aerogel blanket according to an embodiment of the present invention, the winding rod has a cylindrical shape having a hollow penetrating in the longitudinal direction, and a blanket in a long sheet form is wound in a roll form on the outer circumferential surface thereof.

In the second aspect of the method for manufacturing an aerogel blanket according to an embodiment of the present invention, the outside of the blanket wound on the winding rod may allow a catalyzed sol to be impregnated thereinto fast, and thus, stably gelled. However, there is a problem in that it takes a long time for the sol to be impregnated into the inside of the blanket. In order to prevent the above, the outer circumferential surface of the winding rod has a plurality of connection holes which are connected to the hollow.

In the second aspect of the method for manufacturing an aerogel blanket according to an embodiment of the present invention, the winding rod has a hollow formed thereinside to allow a catalyzed sol injected into the gelation tank to be introduced, and has a plurality of connection holes to allow the catalyzed sol introduced into the hollow to be discharged to the outside of the winding rod, and to be impregnated into the inside of the blanket wound on the winding rod. Accordingly, the catalyzed sol is simultaneously impregnated on the outside and inside of the blanket and gelled. As a result, the time required for the gelation of the blanket may be greatly shortened, and as a result, the entire blanket may be uniformly gelled.

In the second aspect of the method for manufacturing an aerogel blanket according to an embodiment of the present invention, the diameter of the plurality of connection holes is 3-5 mm, and the holes are formed at regular intervals on the outer circumferential surface of the winding rod. Accordingly, the catalyzed sol may be uniformly supplied to the entire blanket wound on the outer circumferential surface of the winding rod, and accordingly, the entire inside of the blanket may be uniformity gelled.

In the second aspect of the method for manufacturing an aerogel blanket according to an embodiment of the present invention, the support plate is to provide support such that the blanket wound on the winding rod is not irregularly wound, and has a disc shape. The support plate is coupled to each end of the winding rod and supports a side portion of the blanket wound on the winding rod.

In the second aspect of the method for manufacturing an aerogel blanket according to an embodiment of the present invention, the support plate has a fastening groove to which an end of the winding rod is coupled, and has a fastening hole formed on the bottom surface of the fastening groove. That is, the support plate may be coupled to the end of the winding rod through the fastening groove.

In the second aspect of the method for manufacturing an aerogel blanket according to an embodiment of the present invention, the support plate has a plurality of open holes, and the plurality of open holes may allow the catalyzed sol to be introduced into a side portion of the blanket wound on the winding rod, and accordingly, the side portion of the blanket may be stably gelled.

In the second aspect of the method for manufacturing an aerogel blanket according to an embodiment of the present invention, the bobbin includes the winding rod and the support plate, and accordingly, may wind a blanket in a roll form.

In the second aspect of the method for manufacturing an aerogel blanket according to an embodiment of the present invention, the main body is where a gelation tank which receives a bobbin is installed, and includes the gelation tank and a first installation member 220 in which the gelation tank is installed.

In the second aspect of the method for manufacturing an aerogel blanket according to an embodiment of the present invention, the gelation tank is for gelling a blanket received in a bobbin, and includes a gelation chamber provided thereinside and receiving the bobbin, an outlet provided at an outer lower end thereof and connected to the gelation chamber, and an inlet provided at an outer upper end thereof and connected to the gelation chamber.

In the second aspect of the method for manufacturing an aerogel blanket according to an embodiment of the present invention, particularly, the upper portion of the gelation chamber of the gelation tank is opened by a cover, and the lower portion thereof has a ‘U’-shaped cross-sectional shape having curvature corresponding to a blanket wound on the winding rod. Accordingly, when a silica sol is introduced into the gelation chamber, the contact force between the silica sol and the blanket may be increased, and as a result, the gelation of the blanket may be increased.

In the second aspect of the method for manufacturing an aerogel blanket according to an embodiment of the present invention, the gelation tank includes a rotation member provided on both walls of the gelation chamber and coupled to both ends of the bobbin to allow the bobbin to rotate in the gelation chamber.

In the second aspect of the method for manufacturing an aerogel blanket according to an embodiment of the present invention, the rotation member is rotatably installed in through-holes formed on both walls of the gelation chamber, and an end of the bobbin received in the gelation chamber is power transmittably installed.

In the second aspect of the method for manufacturing an aerogel blanket according to an embodiment of the present invention, on one surface of the rotation member, a coupling protrusion in a straight line shape is formed, and at the end of the bobbin, a coupling groove in a straight line shape to which the coupling protrusion is coupled is formed. That is, through the coupling of the coupling protrusion and the coupling groove, the bobbin may be rotated in the same direction when the rotation member is rotated. As a result, the bobbin may be rotatably installed inside the gelation tank.

In the second aspect of the method for manufacturing an aerogel blanket according to an embodiment of the present invention, the main body further includes a second installation member 230 in which a catalyzed sol supplying member is installed. The second installation member includes a bottom piece 231, an installation stand 232 installed at an upper portion of the bottom piece and installed such that the catalyzed sol supplying member is positioned higher than the gelation tank, and a staircase 233 installed at one end of the bottom piece.

In the second aspect of the method for manufacturing an aerogel blanket according to an embodiment of the present invention, the gelation tank includes a rotation handle which rotates the bobbin while being coupled to the other rotation member provided in the gelation tank, and the rotation handle may manually rotate the bobbin from the outside.

In the second aspect of the method for manufacturing an aerogel blanket according to an embodiment of the present invention, on the installation stand of the second installation member, an aging member and a drying member are further installed.

In the second aspect of the method for manufacturing an aerogel blanket according to an embodiment of the present invention, the driving member is for rotating the bobbin received in the gelation tank, and is power transmittably connected to the other rotation member provided in the gelation tank. That is, when the driving member rotates the rotation member, it may rotate the bobbin received in the gelation tank by being interlocked with the rotating member.

In the second aspect of the method for manufacturing an aerogel blanket according to an embodiment of the present invention, the catalyzed sol supplying member is for gelling a blanket by injecting a silica sol into a gelation tank to impregnate the blanket wound on a bobbin, and is installed at the installation stand. The catalyzed sol supplying member supplies a catalyzed sol to a gelation chamber through an inlet of the gelation tank.

In the second aspect of the method for manufacturing an aerogel blanket to an embodiment of the present invention, The aging member is for aging a blanket wound on a bobbin by injecting an aging solution to a gelation tank, and is installed at the installation stand. The aging member supplies an aging solution to a gelation chamber through an inlet of the gelation tank.

In the second aspect of the method for manufacturing an aerogel blanket according to an embodiment of the present invention, the drying member is for drying a blanket wound on a bobbin by supplying hot air of a high temperature to a gelation tank, and is installed at the installation stand. The drying member dries a blanket received in the gelation tank by increasing the temperature of the gelation tank.

Therefore, the device for manufacturing an aerogel blanket according to the second aspect of the method for manufacturing an aerogel blanket according to an embodiment of the present invention may greatly shorten the manufacturing time of an aerogel blanket, may greatly increase the productivity of an aerogel blanket, and as a result, may mass produce an aerogel blanket.

Particularly, the device for manufacturing an aerogel blanket according to the second aspect of the method for manufacturing an aerogel blanket according to an embodiment of the present invention may induce stable gelation regardless of the thickness and length of a blanket by rotating the blanket, and since a bobbin is rotated, the entire blanket wound on the bobbin may be uniformly gelled. Also, since only the bobbin rotates without the rotation of a gelation tank, the shape of the gelation tank is not limited. In addition, since a gelation chamber in the gelation tank is formed in a 'U'-shaped cross-sectional shape, the blanket wound on the bobbin may be more effectively gelled.

In addition, in the second aspect of the method for manufacturing an aerogel blanket according to an embodiment of the present invention, the device for manufacturing an aerogel blanket includes a bobbin on which a blanket is wound, wherein the bobbin may include a winding rod and a support plate. Here, the outer circumferential surface of the winding rod may include a fixing clip into which a winding start point is inserted and fixed.

In the second aspect of the method for manufacturing an aerogel blanket according to an embodiment of the present invention, the fixing clip has a pin shape having elastic restoring force, and one end thereof is fixed on the outer circumferential surface of the winding rod and the other end thereof is elastically supported on the outer circumferential surface of the winding rod. Accordingly, when the start point of the blanket is inserted between the other end of the fixing clip and the winding rod, the blanket may be fixed to the starting point of the winding rod by elastic force of the fixing clip, and as a result, the blanket may be simply wound on the outer circumferential surface of the winding rod.

EXAMPLES

Hereinafter, Examples of the present invention will be described in detail so that those skilled in the art may easily carry out the present invention. However, the present invention may be embodied in many different forms, and is not limited to Examples set forth herein.

Example 1

31.90 g of a pre-hydrolyzed TEOS (silica content=20 wt %, HTEOS), 31.35 g of ethanol, and 2.8 g of water were added to a reactor and mixed to prepare a silica precursor composition. In addition, 7.77 g of trimethylethoxysilane (TMES) as a hydrophobizing agent, 47.28 g of ethanol, 4.22 g of water, and as a base catalyst, 2.75 g of ammonia water (concentration: 30 wt %) were added to another reactor and mixed to prepare a catalyst composition. At this time, in the prepared catalyst composition, the total amount of the water was 5.2 equivalents based on 1 equivalent of TMES, and the amount of the base catalyst was 0.64 parts by weight based on 100 parts by weight of the entire sol. A silica precursor prepared and the catalyst composition were mixed to prepare a silica sol, and the silica sol was impregnated into a fiber (a glass fiber mat, 10 mm) which is a substrate for a blanket. A fiber composite impregnated with the silica sol was left to stand at room temperature for 24 hours to be subjected to gelation, surface modification, and aging. A silica wet gel blanket manufactured was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Example 2

<Preparation of Catalyzed Sol>

Methyl triethoxysilane (MTES) and tetraethyl orthosilicate (TEOS) were mixed in a molar ratio of 95:5 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. 1 vol % of an ammonia ethanol solution (a base catalyst solution) was prepared separately therefrom. The silica sol and the base catalyst solution were mixed in a volume ratio of 9:1 to prepare a catalyzed sol.

<Preparation of Wet Gel Blanket>

A bobbin on which a 10 T (10 mm) glass fiber was wound was fixed to a reaction vessel. The catalyzed sol prepared above was introduced into the reaction vessel, and the bobbin on which the glass fiber was wound was rotated to perform gelation. At this time, the introduction rate of the catalyzed sol was controlled to introduce all of the catalyzed sol before the gelation was completed. When the fiber was sufficiently impregnated so that the liquid level in the reaction vessel no longer changed, a drain valve coupled to the reaction vessel was opened to recover remaining sol. 60 minutes later, the gelation was completed, and then aging was performed at a temperature of 60° C. for 20 hours. After the aging was completed, ethanol was introduced into the reaction vessel at a temperature of 60° C. to substitute the solvent.

<Drying Process>

Thereafter, a wet gel blanket was placed into a convention oven and subjected to atmospheric drying at 150° C. for 2 hours to 5 hours to completely remove the solvent and moisture, thereby manufacturing a hydrophobic silica aerogel blanket.

Example 3

A hydrophobic silica aerogel blanket was manufactured in the same manner as in Example 2 except that during the drying process in Example 2, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Comparative Example 1

31.90 g of a pre-hydrolyzed TEOS(HTEOS), 24.41 g of ethanol, and 11.12 g of water were added to a reactor and mixed to prepare a silica precursor composition. In addition, 60.54 g of ethanol and 0.69 g of ammonia water (concentration: 30 wt %) were added to another reactor and mixed to prepare a catalyst composition. A silica precursor prepared and the catalyst composition were mixed to prepare a silica sol, and the silica sol was impregnated into a fiber (a glass fiber mat, 10 mm) which is a substrate for a blanket. Gelation was induced for 10 minutes to manufacture a silica wet gel blanket. The manufactured silica wet gel blanket was aged at a temperature of 50° C. for 1 hour using an ammonia ($NH_3$)/ethanol solution (2.2:97.8 volume ratio). The aged silica wet gel blanket was added with 90 wt % of a hexamethyldisilazane (HMDS)/ethanol solution (5:95 volume ratio) based on the volume of the wet gel blanket, and then was subjected to surface modification at a temperature of 70° C. for 4 hours.

Thereafter, the wet gel blanket was placed into a convention oven and subjected to atmospheric drying at 150° C. for 2 hours to 5 hours to completely remove the solvent and moisture, thereby manufacturing a hydrophobic silica aerogel blanket.

Comparative Example 2

31.90 g of a pre-hydrolyzed TEOS(HTEOS), 24.41 g of ethanol, and 11.12 g of water were added to a reactor and mixed to prepare a silica precursor composition. In addition, 60.54 g of ethanol and 0.69 g of ammonia water (concentration: 30 wt %) were added to another reactor and mixed to prepare a catalyst composition. A silica precursor prepared and the catalyst composition were mixed to prepare a silica sol, and the silica sol was impregnated into a fiber (a glass fiber mat, 10 mm) which is a substrate for a blanket. Gelation was induced for 10 minutes to manufacture a silica wet gel blanket. The manufactured silica wet gel blanket was aged at a temperature of 50° C. for 1 hour using an ammonia ($NH_3$)/ethanol solution (2.2:97.8 volume ratio). The aged silica wet gel blanket was added with 90 wt % of a hexamethyldisilazane (HMDS)/ethanol solution (5:95 volume ratio) based on the volume of the wet gel blanket, and then was subjected to surface modification at a temperature of 70° C. for 4 hours.

Thereafter, the silica wet gel blanket was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Comparative Example 3

31.90 g of a pre-hydrolyzed TEOS(HTEOS), 24.41 g of ethanol, and 11.12 g of water were added to a reactor and mixed to prepare a silica precursor composition. In addition, 60.54 g of ethanol and 0.69 g of ammonia water (concentration: 30 wt %) were added to another reactor and mixed to prepare a catalyst composition. A silica precursor prepared and the catalyst composition were mixed to prepare a silica sol, and the silica sol was impregnated into a fiber (a glass fiber mat, 10 mm) which is a substrate for a blanket. Gelation was induced for 10 minutes to manufacture a silica wet gel blanket. The manufactured silica wet gel blanket was aged at a temperature of 50° C. for 1 hour using an ammonia ($NH_3$)/ethanol solution (2.2:97.8 volume ratio).

Thereafter, the silica wet gel blanket was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Comparative Example 4

<Preparation of Catalyzed Sol>

Tetraethyl orthosilicate (TEOS) and water were mixed in a molar ratio of 1:10 and ethanol having a weight ratio of 1:2 with TEOS was added thereto to prepare a silica sol. In order to facilitate hydrolysis, hydrochloric acid was added to allow the pH of the silica sol to be 3 or less. Based on 100 parts by weight of a silica sol, 0.2 parts by weight of $TiO_2$, an opacifying agent, and 0.2 parts by weight of Ultracarb (LKAB Co., Ltd), a flame retardant were mixed and then stirred for 30 minutes to prepare a silica sol, and 1 vol % of an ammonia ethanol solution (a base catalyst solution) was prepared separately therefrom. The silica sol and the base catalyst solution were mixed in a volume ratio of 9:1 to prepare a catalyzed sol.

<Preparation of Wet Gel Blanket>

A bobbin on which a 10 T (10 mm) glass fiber was wound was fixed to a reaction vessel. The catalyzed sol prepared above was introduced into the reaction vessel, and the bobbin on which the glass fiber was wound was rotated to perform gelation. At this time, the introduction rate of the catalyzed sol was controlled to introduce all of the catalyzed sol before the gelation was completed. When the fiber was sufficiently impregnated so that the liquid level in the reaction vessel no longer changed, a drain valve coupled to the reaction vessel was opened to recover remaining sol. 30 minutes later, when the gelation was completed, an aging solution was introduced into the reaction vessel to perform aging while rotating the bobbin. At this time, the aging solution was 5 vol % of an ammonia ethanol dilution solution, and the aging was performed at a temperature of 60° C. for 20 hours. When the aging was completed, the drain valve was opened to recover the aging solution. Thereafter, a surface modification solution was introduced into the reaction vessel to perform surface modification while rotating the bobbin, and when completed, the surface modification solution was recovered. At this time, the surface modification solution was 10 vol % of a methyl tetraethoxysilane (MTES) ethanol dilution solution, and an amount thereof having the same volume ratio as the wet gel blanket composite was added. The surface modification (hydrophobization) was performed at room temperature for 8 hours.

<Drying Process>

Thereafter, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture, thereby manufacturing a hydrophobic silica aerogel blanket.

EXPERIMENTAL EXAMPLES

For the silica aerogel blanket manufactured in each of Examples 1 to 3 and Comparative Examples 1 to 4, the moisture impregnation rate of 28 days (MIR-28D), the moisture impregnation rate of 96 hours (MIR-96H), the moisture impregnation rate of 15 minutes (MIR-15M), the dust generation amount, and the room temperature thermal conductivity were measured as follows, and the results thereof are shown in Tables 1 and 2.

Moisture impregnation rate of 28 days (MIR-28D wt %): For the silica aerogel blanket manufactured in each of Examples and Comparative Examples, a specimen having a size of 100 mm×100 mm was floated on distilled water of 21±2° C., and a 6.4 mm mesh screen was placed on the specimen to impregnate the specimen by sinking the same to 127 mm below the surface of the water. 28 days later, the mesh screen was removed, and when the specimen rose to the surface, the specimen was picked up with a clamp and was hung vertically for 60±5 seconds. Thereafter, the weight before and after the impregnation were respectively measured to determine a weight increase rate, and using Equation 1 below, the moisture impregnation rate of 28 days was calculated. The lower the moisture impregnation rate of 28 days, the higher 25 the long-term water repellency of the aerogel blanket.

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight after impregnation in distilled water}×100 [Equation 1]

Moisture impregnation rate of 96 hours (MIR-96H, wt %): For the silica aerogel blanket manufactured in each of Examples and Comparative Examples, a specimen having a size of 100 mm×100 mm was floated on distilled water of 21±2° C., and a 6.4 mm mesh screen was placed on the specimen to impregnate the specimen by sinking the same to 127 mm below the surface of the water. 96 hours later, the mesh screen was removed, and when the specimen rose to the surface, the specimen was picked up with a clamp and was hung vertically for 60±5 seconds. Thereafter, the weight before and after the impregnation were respectively measured to determine a weight increase rate, and using Equation 2 below, the moisture impregnation rate of 96 hours was calculated. The lower the moisture impregnation rate of 96 hours, the higher the mid-term water repellency of the aerogel blanket.

Moisture impregnation rate of 96 hours (MIR-96H, wt %)={(Aerogel blanket weight after impregnation in distilled water of 21±2° C. for 96 hours−Aerogel blanket weight before impregnation in distilled water)/Aerogel blanket weight before impregnation in distilled water}×100 [Equation 2]

Moisture impregnation rate of 15 minutes (MIR-15M, wt %): For the silica aerogel blanket manufactured in each of Examples and Comparative Examples, a specimen having a size of 100 mm×100 mm was floated on distilled water of 21±2° C., and a 6.4 mm mesh screen was placed on the specimen to impregnate the specimen by sinking the same to 127 mm below the surface of the water. 15 minutes later, the mesh screen was removed, and when the specimen rose to the surface, the specimen was picked up with a clamp and was hung vertically for 60±5 seconds. Thereafter, the weight before and after the impregnation were respectively measured to determine a weight increase rate, and using Equation 3 below, the moisture impregnation rate of 15 minutes was calculated. The lower the moisture impregnation rate of 15 minutes, the higher the short-term water repellency of the aerogel blanket.

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 3]

Dust generation amount (wt %): For the silica aerogel blanket manufactured in each of Examples and Comparative Examples, a specimen having a size of 12 mm×12 mm was vibrated for 6 hours under a vibration condition of 18 Hz/6 mm. Thereafter, the weight before and after the vibration were respectively measured to determine a weight decrease rate, and using Equation 10 below, the dust generation amount was calculated. The lower the dust generation amount, the better the constructability.

Dust generation amount(wt %)={(Aerogel blanket weight before vibration−Aerogel blanket weight after vibration of 18 Hz/6 mm)/Aerogel blanket weight before vibration}×100 [Equation 10]

Room temperature thermal conductivity (mW/mK): A sample having a size of 30 cm×30 cm was prepared for the silica aerogel blanket manufactured in each of Examples and Comparative Examples. The room temperature (23±5° C.) thermal conductivity was measured for each sample using the HFM 436 Lambda equipment of NETZSCH Co., Ltd.

TABLE 1

| Classification | | Examples 1 | 2 | 3 |
|---|---|---|---|---|
| Silica sol[1] | (Type) (Molar ratio) | TMES:TEOS 38:62 | MTES:TEOS 95:5 | MTES:TEOS 95:5 |
| Surface modification step | | X | X | X |
| Drying step | | Supercritical | Atmospheric | Supercritical |
| Moisture impregnation rate of 15 minutes | (wt %) | 1.5 | 1.2 | 1.0 |
| Moisture impregnation rate of 96 hours | (wt %) | 40.0 | 10.0 | 9.0 |
| Moisture impregnation rate of 28 days | (wt %) | 50.0 | 25.0 | 23.0 |
| (MIR-28D)-(MIR-15M) | | 48.5 | 23.8 | 22.0 |
| Dust generation amount | (wt %) | 0.3 | 0.4 | 0.3 |
| Room temperature thermal conductivity | (mW/mK) | 19.5 | 19.5 | 19.2 |

[1]Silicate containing hydrophobizing agent or hydrophobic group: Silica precursor

TABLE 2

| Classification | | Comparative Examples 1 | 2 | 3 | 4 |
|---|---|---|---|---|---|
| Silica sol[2] | (Type) (Molar ratio) | TEOS 100 | TEOS 100 | TEOS 100 | TEOS 100 |
| Surface modification step | | O (HMDS) | O (HMDS) | X | O (MTES) |
| Drying step | | Atmospheric | Super-critical | Super-critical | Super-critical |

TABLE 2-continued

| Classification | | Comparative Examples 1 | 2 | 3 | 4 |
|---|---|---|---|---|---|
| Moisture impregnation rate of 15 minutes | (wt %) | 4.0 | 1.4 | X | 10.0 |
| Moisture impregnation rate of 96 hours | (wt %) | 60.0 | 55.0 | X | 75.0 |
| Moisture impregnation rate of 28 days | (wt %) | 102.0 | 103.0 | X | 110.0 |
| (MIR-28D)-(MIR-15M) | | 98.0 | 101.6 | X | 100.0 |
| Dust generation amount | (wt %) | 1.6 | 0.3 | 0.8 | 0.5 |
| Room temperature thermal conductivity | (mW/mK) | 28.5 | 19.1 | 23.4 | 21.0 |

[2]Silica precursor in silica sol

As shown in Tables 1 and 2, Example 1 performed according to the first aspect of the method for manufacturing an aerogel blanket of the present invention was confirmed to have excellent short-term water repellency, mid-term water repellency, and long-term water repellency, and Examples 2 to 3 performed according to the second aspect of the method for manufacturing an aerogel blanket of the present invention was also confirmed to have excellent short-term water repellency, mid-term water repellency, and long-term water repellency, regardless of drying conditions. This is due to the fact that a hydrophobic group is uniformly introduced both on the outermost surface of an aerogel and on the surface of the inside of the aerogel in the aerogel blanket manufactured according to the present invention.

Furthermore, Examples 1 to 3 according to the present invention all have a suppressed dust generation amount and excellent room temperature thermal conductivity.

On the contrary, Comparative Example 1, in which only the silica precursor was introduced when preparing a silica sol and surface modification was performed from a separate surface modification step unlike the first and second aspects of the method for manufacturing an aerogel blanket of the present invention, had poor long-term water repellency, short-term water repellency, and mid-term water repellency. In addition, the dust generation amount and thermal conductivity thereof were confirmed to have increased compared to those of Examples.

In addition, it was confirmed that Comparative Example 2 subjected to supercritical drying under drying conditions different from those of Comparative Example 1 had improved short-term water repellency compared to Comparative Example 1, but the long-term water repellency thereof was not improved. This is due to the fact that even a surface modification step is additionally performed, a sufficient amount of surface modifier is not introduced into an aerogel, so that when the aerogel is exposed to moisture for a long period of time regardless of drying conditions, the moisture eventually penetrates into the inside of the aerogel and causes moisture adsorption due to the hydrogen bonding between a hydroxy group present on the surface of the inside of the aerogel and the moisture.

In addition, in the case of Comparative Example 3 in which only the silica precursor was introduced when preparing a silica sol and a separate surface modification step was not performed unlike the first and second aspects of the method for manufacturing an aerogel blanket of the present invention, the aerogel blanket itself was hydrophilic, so that moisture was impregnated thereinto in a very excessive amount, which made it impossible to measure a moisture impregnation rate, and the thermal conductivity of Comparative Example 3 was also confirmed to have increased compared to that of Examples.

In addition, in the case of Comparative Example 4 in which the silicate containing a hydrophobic group according to the second aspect of the method for manufacturing an aerogel blanket of the present invention was not included in a silica precursor composition but was used as a surface modifier in a surface modification step in the same content, the surface modifier did not fully function as a hydrophobizing agent and a sufficient amount of surface modifier was not introduced into an aerogel, so that the short-term water repellency, mid-term water repellency, and long-term water repellency of Comparative Example 4 were all confirmed to be poor.

From the above results, it can be confirmed that the aerogel blanket according to the present invention has excellent long-term water repellency, and thus, may maintain the thermal insulation performance thereof even under harsh conditions which may cause prolonged exposure to moisture.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. An aerogel blanket having a moisture impregnation rate of 28 days (MIR-28D) of 100 wt % or less, which is calculated by Equation 1 below:

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100, [Equation 1]

wherein the aerogel blanket has a room temperature (23±5° C.) thermal conductivity of 20.0 mW/mK or less.

2. The aerogel blanket of claim 1, wherein the moisture impregnation rate of 28 days (MIR-28D) calculated by Equation 1 above and a moisture impregnation rate of 15 minutes (MIR-15M) calculated by Equation 3 below satisfy Equation 4 below:

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 3]

$$(MIR-28D)-(MIR-15M)\leq 100. \quad \text{[Equation 4]}$$

3. The aerogel blanket of claim 1, wherein the moisture impregnation rate of 28 days (MIR-28D) calculated by Equation 1 above and the moisture impregnation rate of 15 minutes (MIR-15M) calculated by Equation 3 below satisfy Equation 5 below:

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 3]

$$1\leq (MIR-28D)-(MIR-15M)\leq 90. \quad \text{[Equation 5]}$$

4. The aerogel blanket of claim 1, wherein the aerogel blanket has the moisture impregnation rate of 28 days (MIR-28D) of 70 wt % or less, which is calculated by Equation 1 above.

5. The aerogel blanket of claim 1, wherein the aerogel blanket has the moisture impregnation rate of 15 minutes (MIR-15M) of 20 wt % or less, which is calculated by Equation 3 below:

Moisture impregnation rate of 15 minutes (MIR-15M, wt %)={(Aerogel blanket weight after impregnation in distilled water of 21±2° C. for 15 minutes−Aerogel blanket weight before impregnation in distilled water)/Aerogel blanket weight before impregnation in distilled water}×100. [Equation 3]

6. The aerogel blanket of claim 1, wherein the aerogel blanket has a moisture impregnation rate of 96 hours (MIR-96H) of 50 wt % or less, which is calculated by Equation 2 below:

Moisture impregnation rate of 96 hours (MIR-96H, wt %)={(Aerogel blanket weight after impregnation in distilled water of 21±2° C. for 96 hours−Aerogel blanket weight before impregnation in distilled water)/Aerogel blanket weight before impregnation in distilled water}×100. [Equation 2]

7. The aerogel blanket of claim 1, wherein the aerogel blanket has a dust generation amount of 3.0 wt % or less, which is calculated by Equation 10 below:

Dust generation amount (wt %)={(Aerogel blanket weight before vibration−Aerogel blanket weight after vibration of 18 Hz/6 mm)/Aerogel blanket weight before vibration}×100. [Equation 10]

8. The aerogel blanket of claim 1, wherein the aerogel blanket comprises an aerogel and a substrate for a blanket, wherein the aerogel is formed inside and on the surface of the substrate for a blanket.

9. The aerogel blanket of claim 8, wherein the aerogel comprises a hydrophobic group inside of the aerogel.

10. An aerogel blanket having a moisture impregnation rate of 28 days (MIR-28D) of 100 wt % or less, which is calculated by Equation 1 below:

Moisture impregnation rate of 28 days (MIR-28D, wt %)={(Aerogel blanket weight after impregnation in distilled water of 21±2° C. for 28 days−Aerogel blanket weight before impregnation in distilled water)/Aerogel blanket weight before impregnation in distilled water}×100, [Equation 1]

wherein the aerogel blanket includes a blanket and a catalyzed sol, the catalyzed sol includes a silica precursor composition, the silica precursor composition comprises a silicate containing a hydrophobic group and a tetraalkyl silicate, a surface of the aerogel blanket is not modified by a surface modification reaction separate from a hydrophobilizing reaction with the silicate containing a hydrophobic group, and the aerogel blanket has a room temperature (23±5° C.) thermal conductivity of 20.0 mW/mK or less.

11. The aerogel blanket of claim 10, wherein the silicate containing a hydrophobic group comprises one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES).

12. The aerogel blanket of claim 10, wherein the tetraalkyl silicate comprises one or more selected from the group consisting of tetramethyl orthosilicate (TMOS), tetraethyl orthosilicate (TEOS), tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate.

13. The aerogel blanket of claim 10, wherein a molar ratio of the silicate containing a hydrophobic group to the tetraalkyl silicate in the silica precursor composition is 60:40 to 98:2.

14. The aerogel blanket of claim 10, wherein a molar ratio of the silicate containing a hydrophobic group to the tetraalkyl silicate in the silica precursor composition is 85:15 to 98:2.

15. The aerogel blanket of claim 10, wherein a molar ratio of the silicate containing a hydrophobic group to the tetraalkyl silicate in the silica precursor composition is 90:10 to 98:2.

16. The aerogel blanket of claim 10, wherein silica ($SiO_2$) contained in the catalyzed sol is 3 wt % to 30 wt %.

17. The aerogel blanket of claim 10, wherein silica ($SiO_2$) contained in the catalyzed sol is 5 wt % to 20 wt %.

18. The aerogel blanket of claim 10, wherein silica ($SiO_2$) contained in the catalyzed sol is 6 wt % to 12 wt %.

* * * * *